United States Patent [19]
Katayama

[11] Patent Number: 5,600,614
[45] Date of Patent: Feb. 4, 1997

[54] OPTICAL HEAD SYSTEM HAVING SUPER RESOLUTION ELEMENT

[75] Inventor: Ryuichi Katayama, Tokyo, Japan

[73] Assignee: NEC Corporation, Japan

[21] Appl. No.: 442,800

[22] Filed: May 16, 1995

[30] Foreign Application Priority Data

May 17, 1994 [JP] Japan .................................. 6-102409

[51] Int. Cl.⁶ .................................................. G11B 7/095
[52] U.S. Cl. ................................ 369/44.23; 369/112
[58] Field of Search ........................... 369/44.12, 44.23, 369/44.24, 44.37, 112, 117–118

[56] References Cited

U.S. PATENT DOCUMENTS 5,072,437  12/1991  Chikuma ............................. 369/118
5,349,592   9/1994  Ando .

FOREIGN PATENT DOCUMENTS 0346844  12/1989  European Pat. Off. .
0532175   3/1993  European Pat. Off. .
0579843   1/1994  European Pat. Off. .
1-315040  12/1989  Japan .
1-315041  12/1989  Japan .

OTHER PUBLICATIONS

Patent Abstracts of Japan, vol. 18, No. 522, (P–1808), & JP6–180853, Sep. 30, 1994.

*Primary Examiner*—W. R. Young
*Attorney, Agent, or Firm*—Hayes, Soloway, Hennessey, Grossman & Hage, P.C.

[57] ABSTRACT

An optical head system for detecting information recorded on an optical recording medium is provided. In one preferred embodiment, the optical head system has a super resolution element includes a polarization phase shift plate positioned between a ¼ wavelength plate and polarization beam splitter so as to be able to adjust the distance between the polarization phase shift plate and an object lens. In this preferred embodiment, the polarization phase shift plate, ¼ wavelength plate, and object lens are driven together by an actuator.

20 Claims, 21 Drawing Sheets

414b
LiNbO₃
SUBSTRATE

405b
POLARIZATION
DIFFRACTION
PLATE

416b
DIELECTRIC
FILM

414b
LiNbO₃
SUBSTRATE

415b
PROTON
EXCHANGE
REGION

519d POLARIZATION PHASE SHIFT PLATE 522a
522a 522a DIELECTRIC FILM
520a LiNbO$_3$ SUBSTRATE
521a PROTON EXCHANGE REGION

625a
POLARIZATION
PHASE SHIFT
PLATE

625a

719b
POLARIZATION
DIFFRACTION
PLATE

722b
DIELECTRIC
FILM

720b
LiNbO₃
SUBSTRATE

721b
PROTON
EXCHANGE
REGION

825b POLARIZATION DIFFRACTION PLATE

825b 5,600,614

OPTICAL HEAD SYSTEM HAVING SUPER RESOLUTION ELEMENT

FIELD OF THE INVENTION

The invention relates to an optical head system used in an optical disk reproducing apparatus, especially to the arrangement of optical elements composing an optical head system.

BACKGROUND OF THE INVENTION

As shown in Japanese Patent Publications Kokai H1-315041 and H1-315040, a conventional optical head system for an optical disk reproducing apparatus includes a semiconductor laser, a collimator lens, a phase shift plate or a shade plate for realizing super resolution, first and second polarization beam splitters, a ¼ wavelength plate, an object lens, an information signal detector and an error signal detector.

In operation, a laser beam generated by the semiconductor laser is supplied through the collimator lens, the phase shift plate, the first and second polarization beam splitters, the ¼ wavelength plate and the object lens to the optical disk. A light reflected from the optical disk is backwardly supplied through the object lens and the ¼ wavelength plate to the second polarization beam splitter so as to guide the reflected light to the information signal detector. In accordance with the light detected by the information signal detector, information recorded on the optical disk is reproduced. A light which has passed through the second polarization beam splitter is reflected from the first polarization beam splitter to the error signal detector so that error signals are detected thereby.

Although the focal length of the object lens and the distance between the phase shift plate (or shade plate) and the object lens should be the same in order to equalize phase distribution of a condensed light spot on the optical disk, however, it is difficult to meet such a requirement according to the above mentioned conventional system, because the first and second polarization beam splitters and the ¼ wavelength plate are arranged between the phase shift plate and the object lens.

Although the phase shift plate and the object lens must be aligned precisely on the common axis in order to have a light spot having symmetric strength distribution on the optical disk, however, according to the conventional optical head system, the object lens must be moved to control tracking and whereby the optical axis shifts.

SUMMARY OF THE INVENTION

Accordingly, an object of the invention is to provide an improved optical head system, in which a light condensed onto an optical disk has symmetric phase distribution.

Another object of the invention is to provide an improved optical head system, in which a light condensed onto an optical disk has symmetric distribution in light strength.

According to an aspect of the invention, a super resolution element is positioned between a ¼ wavelength plate and a polarization beam splitter so as to be able to adjust the distance between the super resolution element and an object lens flexibly. In practice, for example, an optical head system includes a light source which supplies an input light toward a surface of the optical recording medium; an object lens, positioned between the light source and the optical recording medium, which condenses the input light to the optical recording medium; a polarization beam splitter, positioned between the light source and the object lens, which divides a reflection light reflected from the optical disk to form an information signal, through which the input light passes; an information signal detector which receives the information signal and detects information recorded on the optical recording medium in accordance with the received information signal; and a super resolution element positioned between the polarization beam splitter and the object lens for decreasing the diameter of a condensed light spot on the optical recording medium, through which a light reflected from the optical recording medium passes.

Preferably, the super resolution element, a ¼ wavelength plate and the object lens are driven all together by an actuator to control tracking and the like. The optical head system is designed so that the focal length of the object lens is equal to the distance between the super resolution element and the object lens.

DESCRIPTION OF THE PREFERRED EMBODIMENTS

Figure 1:
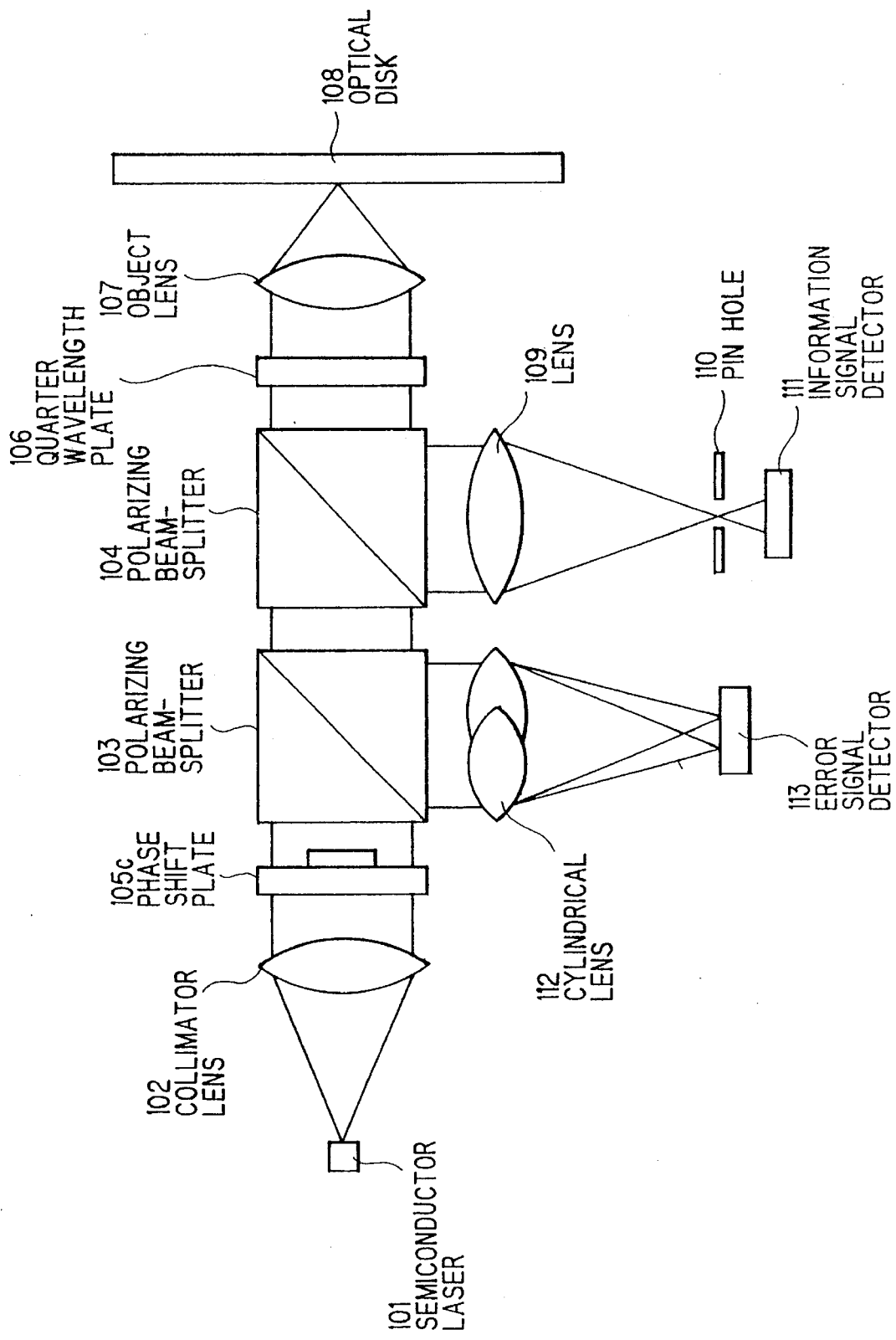
FIG. 1 is an schematic diagram illustrating a first conventional optical head system.

For better understanding of the invention, conventional technology shown in FIGS. 1 to 8 is first described. FIG. 1 shows a first conventional optical head system, which includes a semiconductor laser 101 providing laser beams, a collimator lens 102 arranged next to the semiconductor laser 101, first and second polarizing beam-splitters 103 and 104 arranged next to the collimator lens 102, a phase shift plate 105c arranged between the collimator lens 102 and the first polarizing beam-splitter 103, a quarter (¼) wavelength plate 106 arranged next to the second polarizing beam-splitter 104, an object lens 107 arranged between the quarter wavelength plate 106 and an optical disk 108, a lens 109 arranged so as to receive reflection light from the second polarizing beam-splitter 104, a pin hole 110 arranged next to the lens 109, an information signal detector 111 arranged to received a light passing through the pin hole 110, a cylindrical lens 112 arranged to receive a reflection light from the first polarizing beam-splitter 103, and an error signal detector 113 arranged to receive a light passing through the cylindrical lens 112.

Figure 2:
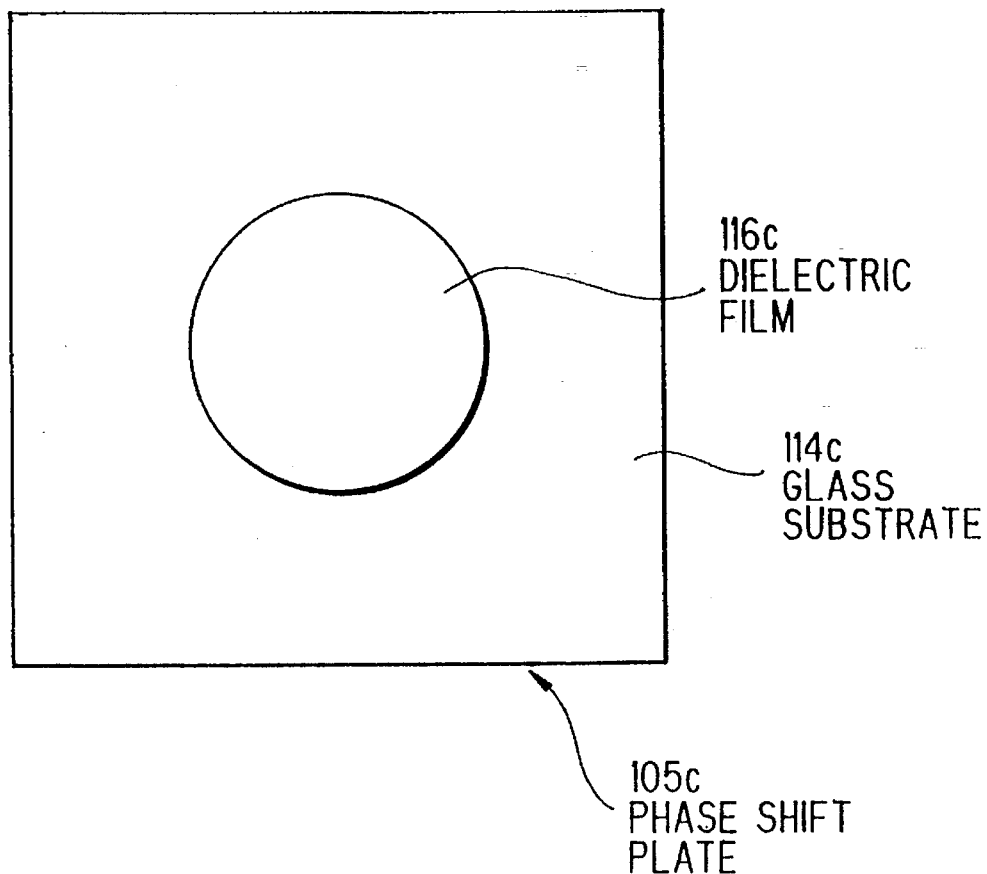
FIG. 2 is a plane view showing a phase shift plate used in the first conventional optical head system shown in FIG. 1.
Figure 3:
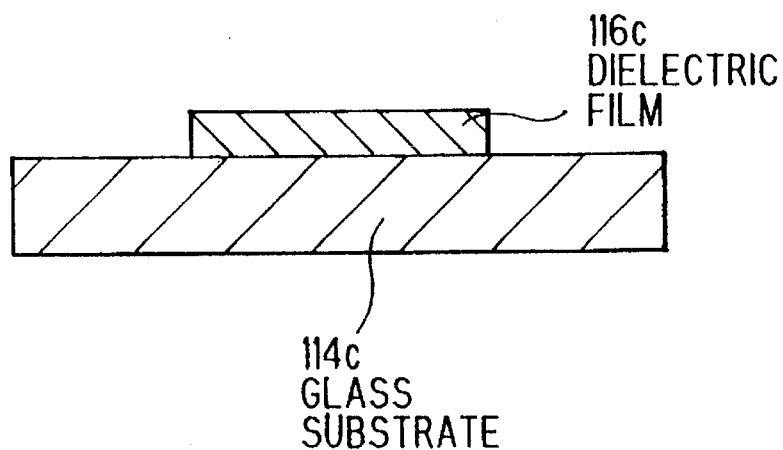
FIG. 3 is a cross sectional view showing the phase shift plate shown in FIG. 2.

The collimator lens 102 converts an input light supplied from the semiconductor laser 101 into a parallel light. FIGS. 2 and 3 show the phase shift plate 105c, which includes a glass substrate 114c and a dielectric film 116c provided on the glass substrate 114c and having a round shape.

In operation, a light generated by the semiconductor laser 101 is supplied through the collimator lens 102 to the phase shift plate 105c. A light supplied to the dielectric film 116c is shifted in phase by $\pi$, and then, the light is supplied through the first and second polarizing beam-splitters 103 and 104, the quarter wavelength plate 106 and the object lens 107 to the optical disk 108. A light reflected from the optical disk 108 passes backwardly through the object lens 107 and the quarter wavelength plate 106 and reaches the second polarizing beam-splitter 104. Some of the light reaching the second polarizing beam-splitter 104 is reflected toward the lens 109, and is supplied through the pin hole 110 to the information signal detector 111. The information signal detector 111 detects information recorded on the optical disk 108, and the detected information is reproduced. On the other hand, a light passed through the second polarizing beam-splitter 104 reaches the first polarizing beam-splitter 103, and is reflected from the beam-splitter 103 toward the cylindrical lens 112. Astigmatism is given to the light reached the cylindrical lens 112, and the light is received by the error signal detector 113. In accordance with the light received by the error signal detector 113, focus error and track error are detected.

Figure 4:
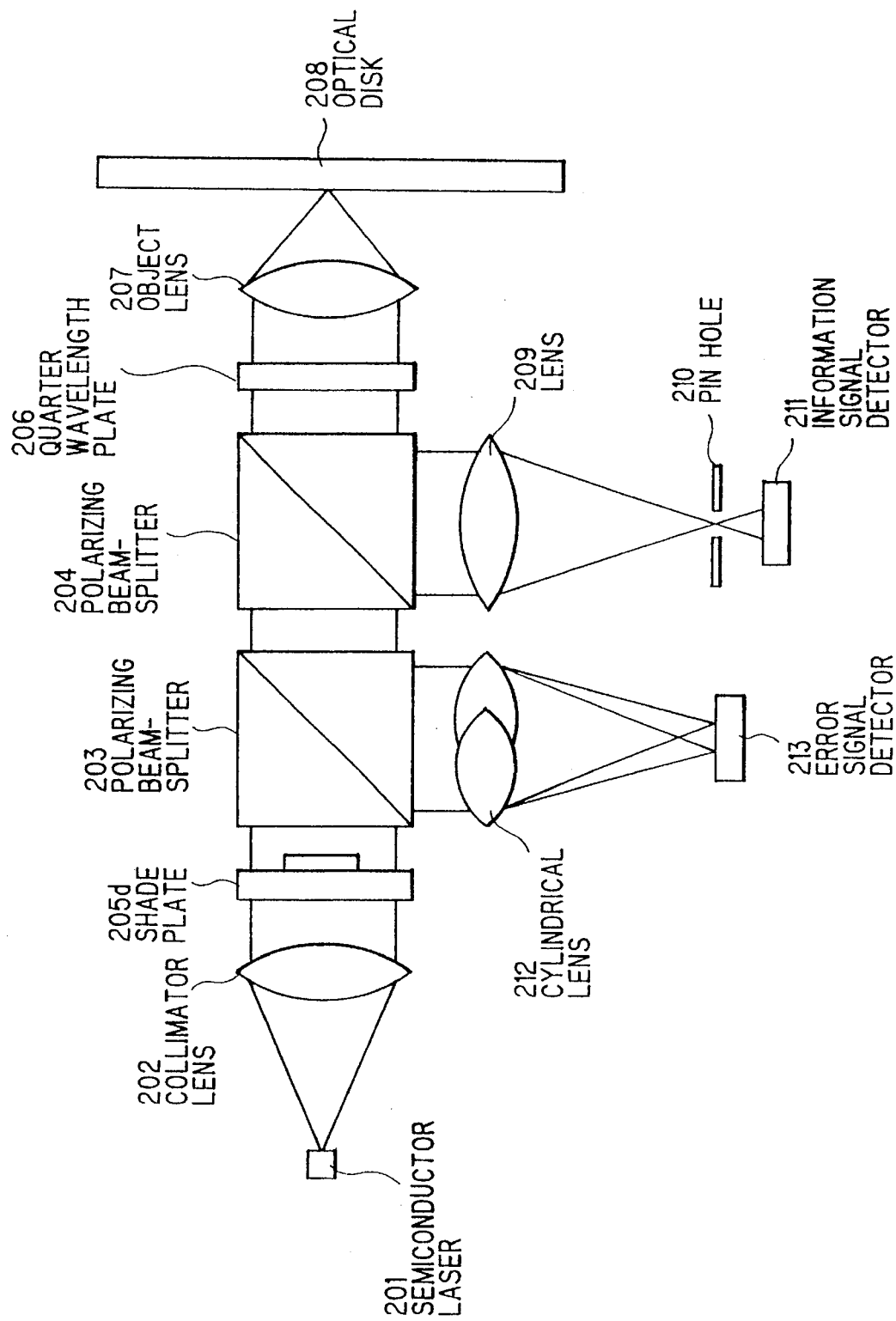
FIG. 4 is an schematic diagram illustrating a second conventional optical head system.

FIG. 4 shows a second conventional optical head system, which includes a semiconductor laser 201 providing laser beams, a collimator lens 202 arranged next to the semiconductor laser 201, first and second polarizing beam-splitters 203 and 204 arranged next to the collimator lens 202, a shade plate 205d arranged between the collimator lens 202 and the first polarizing beam-splitter 203, a quarter (¼) wavelength plate 206 arranged next to the second polarizing beam-splitter 204, an object lens 207 arranged between the quarter wavelength plate 206 and an optical disk 208, a lens 209 arranged so as to receive reflection light from the second polarizing beam-splitter 204, a pin hole 210 arranged next to the lens 209, an information signal detector 211 arranged to receive a light passing through the pin hole 210, a cylindrical lens 212 arranged to receive a reflection light from the first polarizing beam-splitter 203, and an error signal detector 213 arranged to receive a light passing through the cylindrical lens 212.

Figure 5:
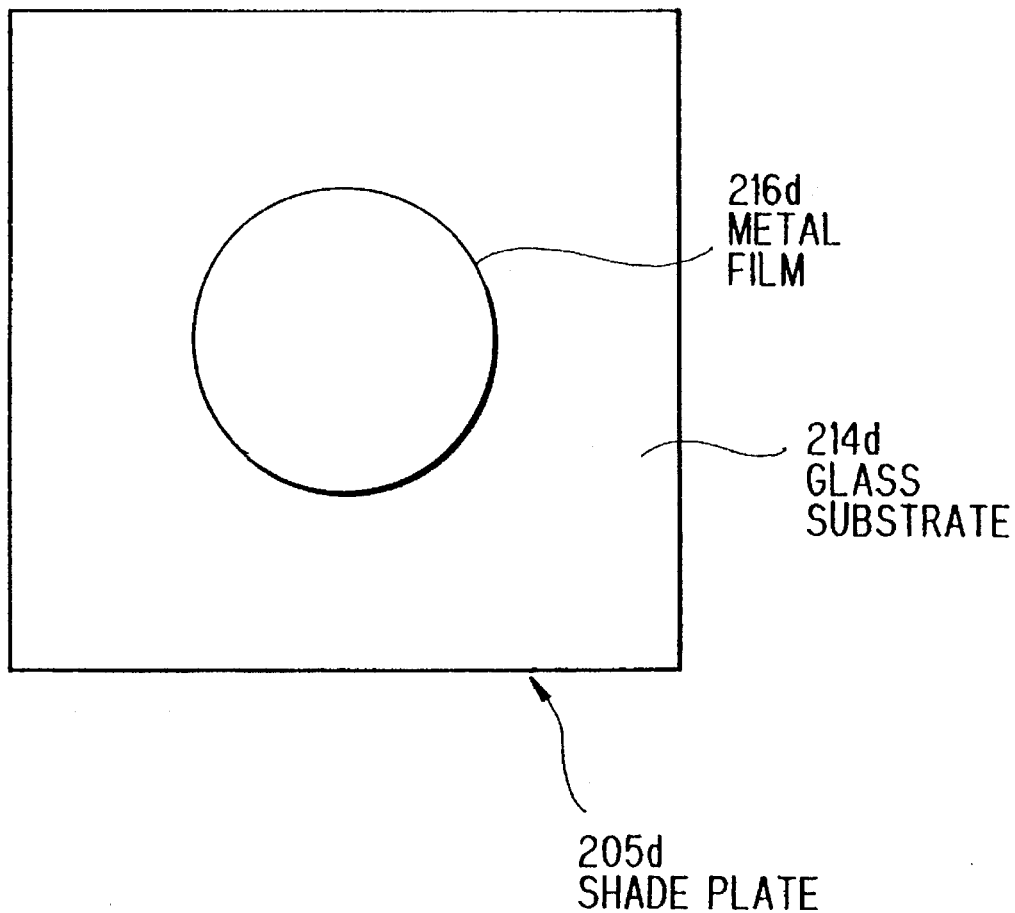
FIG. 5 is a plane view showing a shade plate used in the second conventional optical head system shown in FIG. 4.
Figure 6:
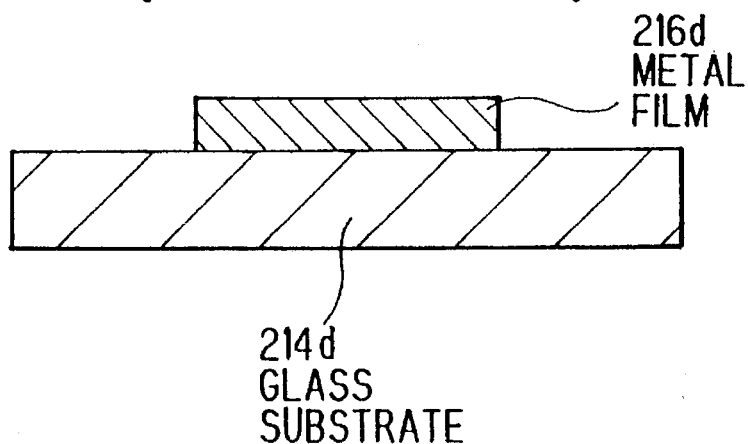
FIG. 6 is a cross sectional view showing the shade plate shown in FIG. 5.

The collimator lens 202 converts an input light supplied from the semiconductor laser 201 into a parallel light. FIGS. 5 and 6 show the shade plate 205d, which includes a glass substrate 214d and a metal film 216d provided on the glass substrate 214d and having a round shape.

In operation, a light generated by the semiconductor laser 201 is supplied through the collimator lens 202 to the shade plate 205d. A light reaching the metal film 216d is perfectly shaded thereby, and the other light passes through the glass substrate 214d. The light passing through the shade plate 205d is supplied through the first and second polarizing beam-splitters 203 and 204, the quarter wavelength plate 206 and the object lens 207 to the optical disk 208. A light reflected from the optical disk 208 passes through the object lens 207 and the quarter wavelength plate 206 and reaches the second polarizing beam-splitter 204. Some of the light reaching the second polarizing beam-splitter 204 is reflected toward the lens 209, and is supplied through the pin hole 210 to the information signal detector 211. The information signal detector 211 detects information recorded on the optical disk 208, and the detected information is reproduced. On the other hand, a light passed through the second polarizing beam-splitter 204 reaches the first polarizing beam-splitter 203, and is reflected from the beam-splitter 203 toward the cylindrical lens 212. Astigmatism is given to the light reaching the cylindrical lens 212, and the light is received by the error signal detector 213. In accordance with the light received by the error signal detector 213, focus errors and track errors are detected.

Figure 7:
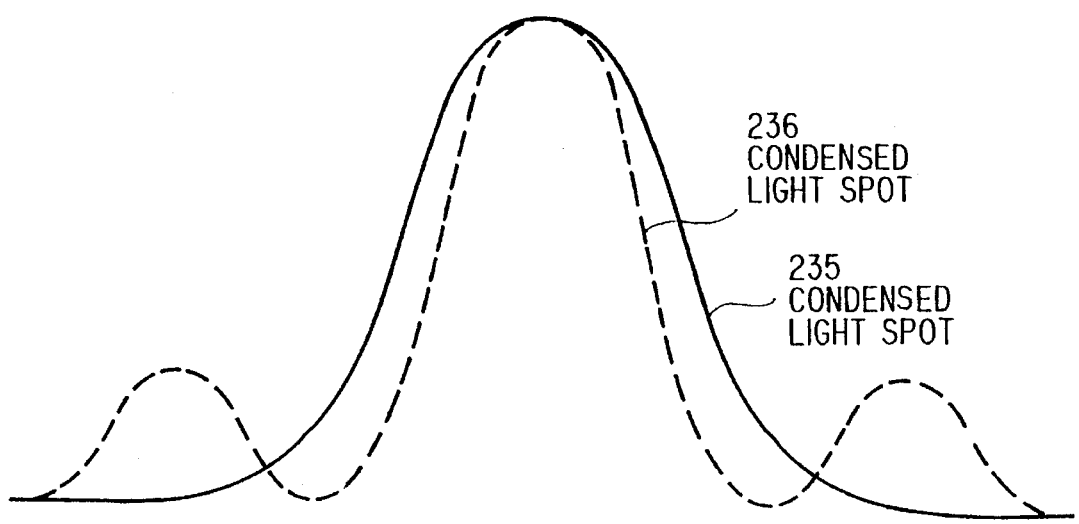
FIG. 7 is an schematic diagram showing the shapes of condensed light spots.

As shown in FIG. 7, if no super resolution technique is employed in an optical head system, a condensed light spot 235 having a wider diameter is made on the optical disk 208 (108). In contrast, if super resolution technique is employed by using the phase shift plate 105c or shade plate 205d in an optical head system, a condensed light spot 236 makes a main lobe having a smaller diameter. On the other hand, the condensed light spot 236 makes side lobes. The side lobes are removed by the pin hole 210 (110) so that the main lobe only is detected by the information signal detector 211 (111).

Figure 8:
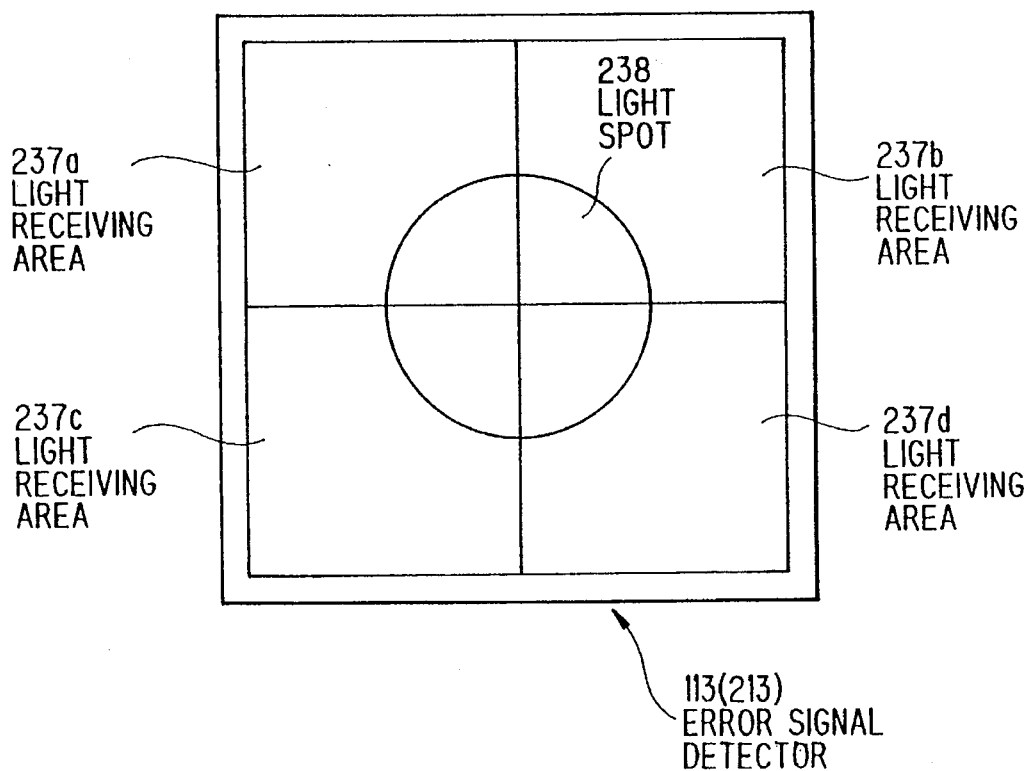
FIG. 8 is a plane view showing an error signal detector used in an optical head system.

FIG. 8 shows the error signal detector 213 (113), which is provided with four light receiving areas 237a, 237b, 237c and 237d. According to the theory of the astigmatism method, a focus error signal "X" is given by the following equation where outputs of the light receiving areas 237a, 237b, 237c and 237d are V(37a), V(37b), V(37c) and V(37d), respectively:

$$X=\{V(37a)+V(37d)\}-\{V(37b)+V(37c)\}$$

According to the theory of the push-pull method, a tracking error signal "Y" is given by the following equation:

$$Y=\{V(37a)+V(37b)\}-\{V(37c)+V(37d)\}$$

According to the above mentioned first and second conventional optical head systems, it is difficult to equalize the focal length of the object lens and the distance between the phase shift plate and the object lens, because the first and second polarizing beam splitters and the ¼ wavelength plate are arranged between the phase shift plate and the object lens. Further, in order to control tracking condition, the object lens is moved whereby the optical axis shifts.

Figure 9:
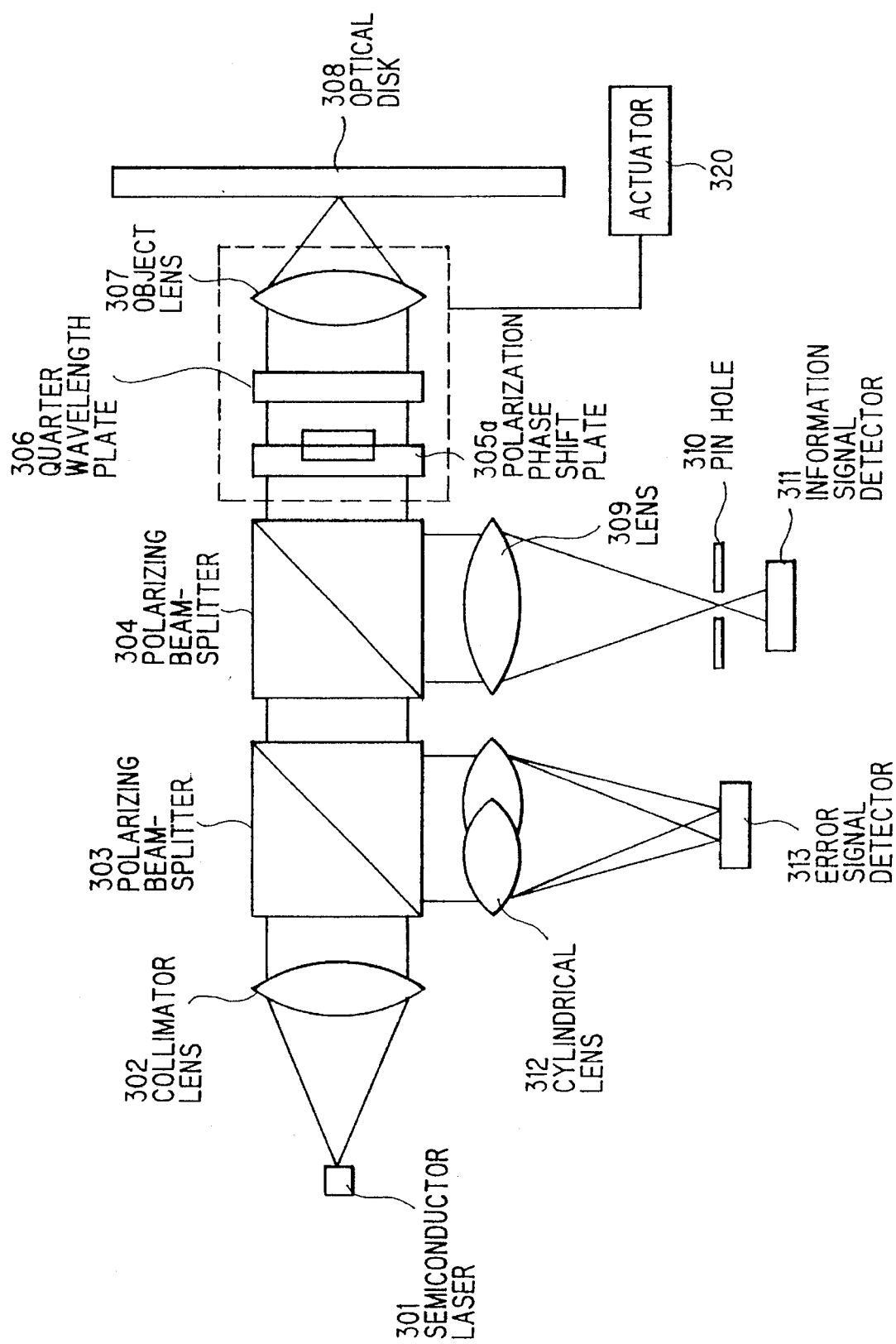
FIG. 9 is an schematic diagram illustrating an optical head system of a first preferred embodiment according to the invention.

FIG. 9 shows an optical head system of a first preferred embodiment, which includes a semiconductor laser 301 providing laser beams, a collimator lens 302 arranged next to the semiconductor laser 301, first and second polarizing beam-splitters 303 and 304 arranged next to the collimator lens 302, a polarization phase shift plate 305a arranged next to the second polarizing beam-splitter 303, a quarter (¼) wavelength plate 306 arranged next to the polarization phase shift plate 305a, an object lens 307 arranged between the quarter wavelength plate 306 and an optical disk 308, a lens 309 arranged so as to receive a reflection light from the second polarizing beam-splitter 304, a pin hole 310 arranged below the lens 309, an information signal detector 311 arranged to receive a light passing through the pin hole 310, a cylindrical lens 312 arranged to receive a reflection light from the first polarizing beam-splitter 303, an error signal detector 313 arranged to receive a light passing through the cylindrical lens 312, and an actuator 320 for driving the polarization phase shift plate 305a, the ¼ wavelength plate 306 and the object lens 307 all together.

Figure 10:
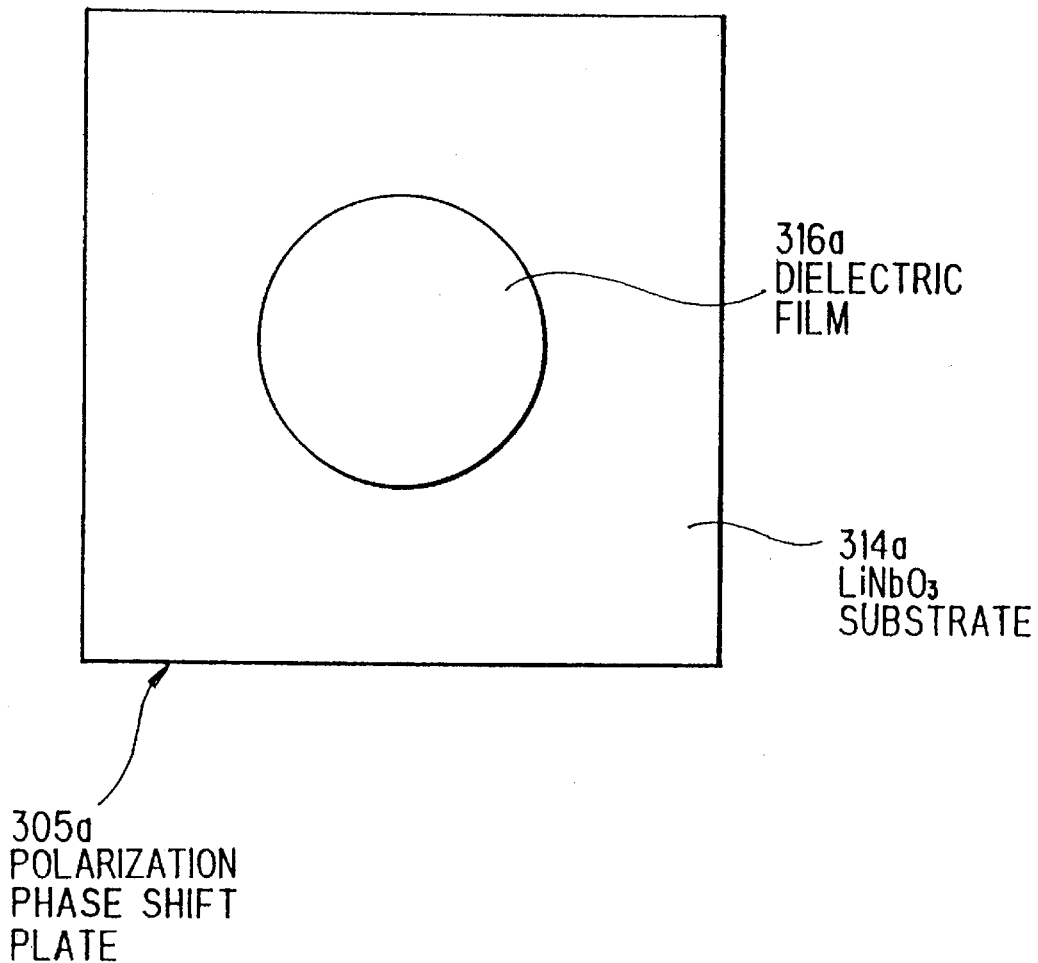
FIG. 10 is a plane view showing a polarization phase shift plate used in the first preferred embodiment.
Figure 11:
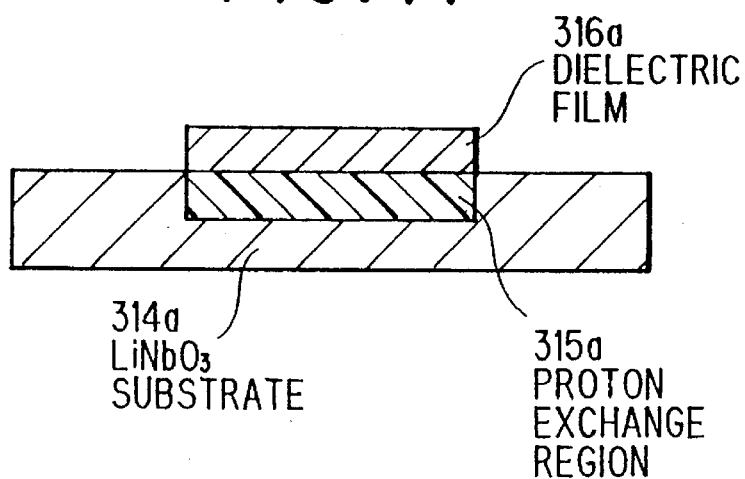
FIG. 11 is a cross sectional view showing the polarization phase shift plate shown in FIG. 10.

The collimator lens 302 converts an input light supplied from the semiconductor laser 301 into a parallel light. FIGS. 10 and 11 show the polarization phase shift plate 305a, which includes a LiNbO₃ substrate 314a, a proton exchange region 315a formed in the LiNbO₃ substrate 314a and having a round shape, and a dielectric film 316a provided on the proton exchange region 315a and having a round shape as well. The proton exchange region 315a and the dielectric film 316a comprise a phase shift region so that an extraordinary light reaching the phase shift region is shifted in phase by π, while an ordinary light passes through the phase shift region completely. The dielectric film 316a may be made of $Nb_2O_5$.

In operation, a light generated by the semiconductor laser 301 is supplied as an extraordinary light through the collimator lens 302, the polarizing beam splitters 303 and 304 to the polarization phase shift plate 315a. The extraordinary light reaching the phase shift region is shifted in phase by π, then the light is supplied to the quarter wavelength plate 306, so that the input light is converted into a circular polarized light. The circular polarized light is condensed on the optical disk 308 by the object lens 307. A light reflected from the optical disk 308 is backwardly supplied through the object lens 307 and the quarter wavelength plate 306 to the polarization phase shift plate 305a as an ordinary light. The ordinary light passes through the polarization phase shift plate 305a, and then a part of the light is reflected from the polarizing beam splitter 304 to the lens 309. The reflected light is condensed by the lens 309 and passes through the pin hole 310. The light passed through the pin hole 310 is received by the information signal detector 311, so that information recorded on the optical disk 308 is reproduced. On the other hand, the entire light passed through the polarizing beam splitter 304 is reflected from the polarizing beam splitter 303 toward the cylindrical lens 312. Astigmatism is given to the light reached the cylindrical lens 312, and the light is received by the error signal detector 313. In accordance with the light received by the error signal detector 313, focus error and track error are detected. The function and operation of the error signal detector 313 is the same as those of the conventional one shown in FIG. 8.

Figure 12A:
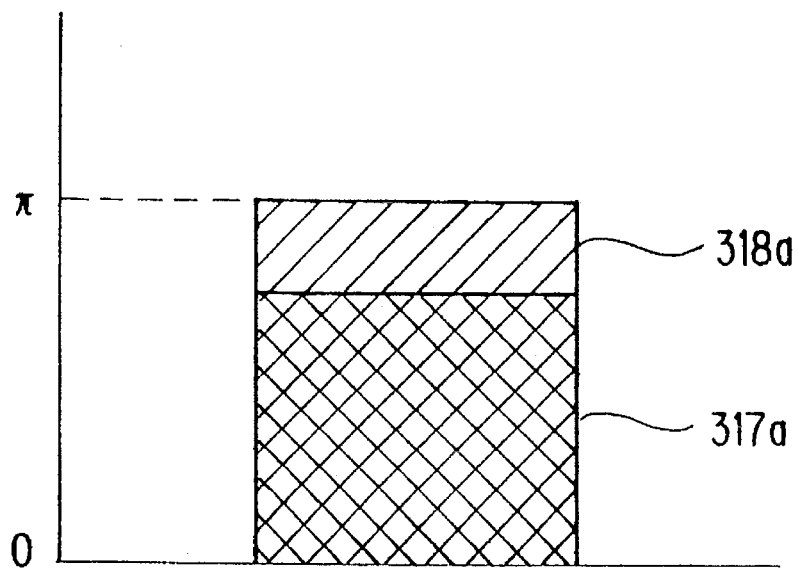
FIGS. 12A and 12B are graphs each showing the variation of phase by the polarization phase shift plate shown in FIGS. 10 and 11.
Figure 12B:
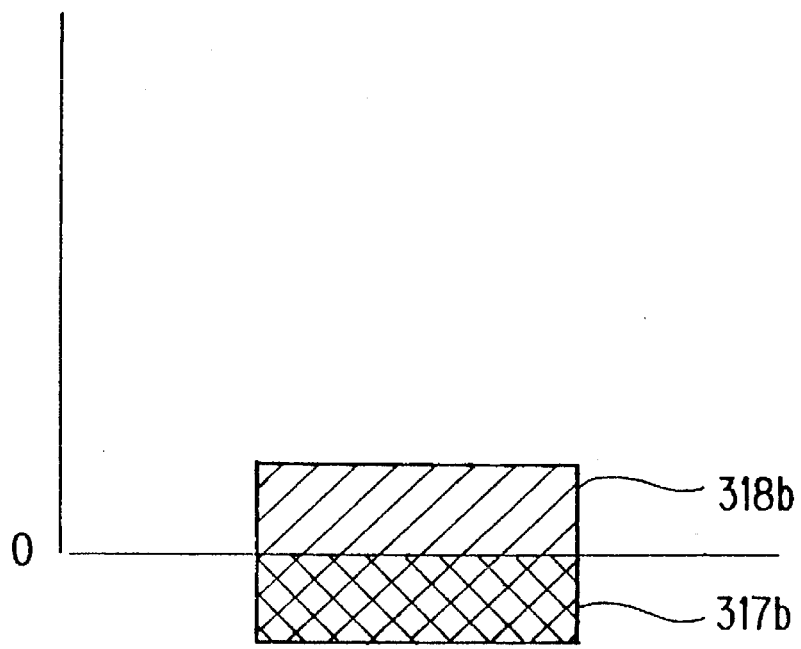

FIGS. 12A and 12B show the change of phase of light supplied to the polarization phase shift plate 305a, in which FIG. 12A is for an extraordinary light, polarized in a direction parallel to the optical axis, and FIG. 12B is for an ordinary light, polarized in a direction orthogonal to the optical axis. The shifted lengths of phase δe and δo of extraordinary and ordinary lights at the phase shift region are given by the following formulas, respectively, where the differences of the indexes of refraction of the proton exchange region 315a and the LiNbO₃ substrate 314a to extraordinary and ordinary lights are Δne and Δno, the index of refraction of the dielectric film 316a is "n", the depth of the proton exchange region 315a is Tp, the thickness of the dielectric film 316a is Td, and the wavelength of a light is λ:

$$2\pi/\lambda \times \{(n-1)Td+\Delta ne\ Tp\}=\delta e$$

$$2\pi/\lambda \times \{(n-1)Td+\Delta no\ Tp\}=\delta o$$

In FIGS. 12A and 12B, 318a and 318b show the change of phase by the dielectric film 316a and 317a and 317b show the change of phase by the proton exchange region 315a, respectively.

In practice, Δne=0.12, Δno=−0.04, n=2.2 (when the dielectric film 316a is of $Nb_2O_5$). For example, when that λ=0.78 μm, Tp=2.4375 μm and Td=81.25 nm, δe=π and δo=0. Accordingly, an extraordinary light is shifted in phase by π at the polarization phase shift plate 305a, but an ordinary light passes through the polarization phase shift plate 305a without being shifted in phase.

Figure 13:
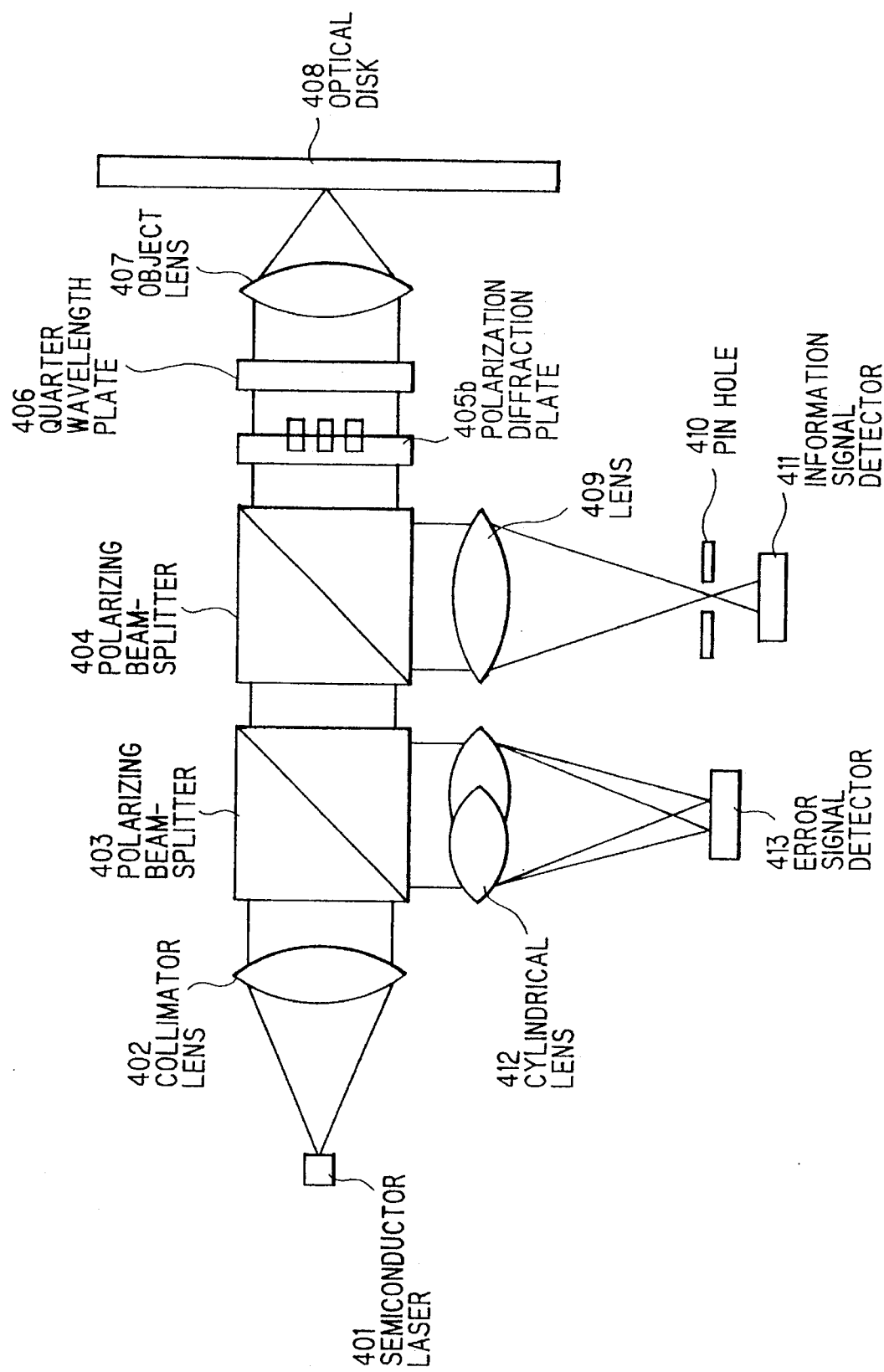
FIG. 13 is an schematic diagram illustrating an optical head system of a second preferred embodiment according to the invention.

FIG. 13 shows an optical head system of a second preferred embodiment, which includes a semiconductor laser 401 providing laser beams, a collimator lens 402 arranged next to the semiconductor laser 401, first and second polarizing beam-splitters 403 and 404 arranged next to the collimator lens 402, a polarization diffraction plate 405b arranged next to the second polarizing beam-splitter 404, a quarter (¼) wavelength plate 406 arranged next to the polarization diffraction plate 405b, an object lens 407 arranged between the quarter wavelength plate 406 and an optical disk 408, a lens 409 arranged so as to receive a reflection light from the second polarizing beam-splitter 404, a pin hole 410 arranged below the lens 409, an information signal detector 411 arranged to receive a light passing through the pin hole 410, a cylindrical lens 412 arranged to receive a reflection light from the first polarizing beam-splitter 403, and an error signal detector 413 arranged to receive a light passing through the cylindrical lens 412. In this system, an actuator may be employed to drive the polarization diffraction plate 405b, the ¼ wavelength plate 406 and the object lens 407 all together.

Figure 14:
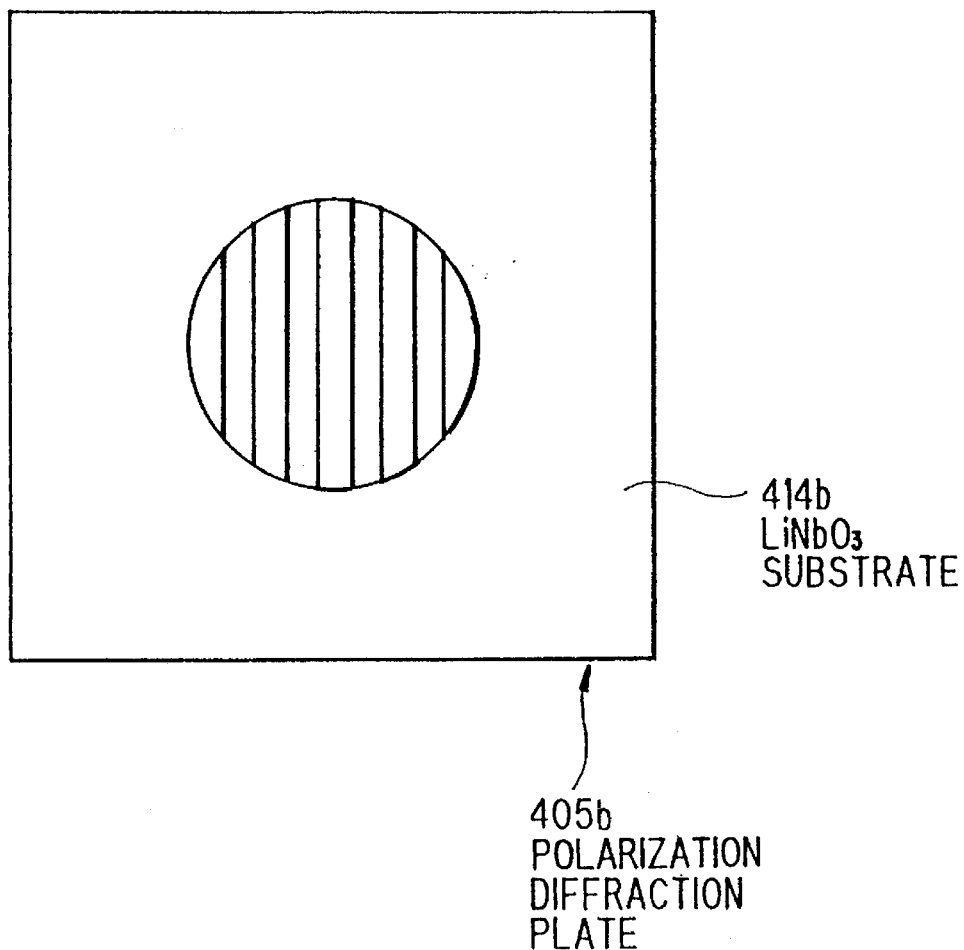
FIG. 14 is a plane view showing a polarization diffraction plate used in the second preferred embodiment.
Figure 15:
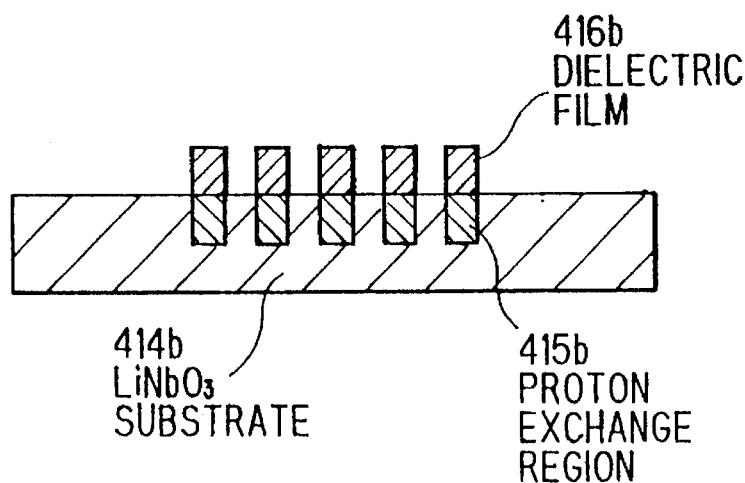
FIG. 15 is a cross sectional view showing the polarization diffraction plate shown in FIG. 14.

The collimator lens 402 converts an input light supplied from the semiconductor laser 401 into a parallel light. FIGS. 14 and 15 show the polarization diffraction plate 405b, which includes a LiNbO₃ substrate 414b, a proton exchange region 415b formed in the LiNbO₃ substrate 414b and having a round shape, and a dielectric film 416b provided on the proton exchange region 415b and having a round shape as well. The proton exchange region 415b and the dielectric film 416b comprise a diffraction grating region so that an extraordinary light reached the diffraction grating region is diffracted, while an ordinary light passes through the plate 415b completely. The dielectric film 416b may be made of $Nb_2O_5$.

In operation, a light generated by the semiconductor laser 401 is supplied as an extraordinary light through the collimator lens 402, the polarizing beam splitters 403 and 404 to the polarization diffraction plate 415b. The extraordinary light reaching the diffraction grating region is diffracted, then the transmitted light is supplied to the quarter wavelength plate 406, so that the input light is converted into a circular polarized light. The circular polarized light is condensed on the optical disk 408 by the object lens 407. A light reflected from the optical disk 408 is backwardly supplied through the object lens 407 and the quarter wavelength plate 406 to the polarization diffraction plate 405b as an ordinary light. The ordinary light passes through the polarization diffraction plate 405b, and then a part of the light is reflected from the polarizing beam splitter 404 to the lens 409. The reflected light is condensed by the lens 409 and passes through the pin hole 410. The light passed through the pin hole 410 is received by the information signal detector 411, so that information recorded on the optical disk 408 is reproduced. On the other hand, the entire light passed through the polarizing beam splitter 404 is reflected from the polarizing beam splitter 403 toward the cylindrical lens 412. Astigmatism is given to the light reached the cylindrical lens 412, and the light is received by the error signal detector 413. In accordance with the light received by the error signal detector 413, focus error and track error are detected. The function and operation of the error signal detector 413 are the same as those of the conventional one shown in FIG. 8.

Figure 16A:
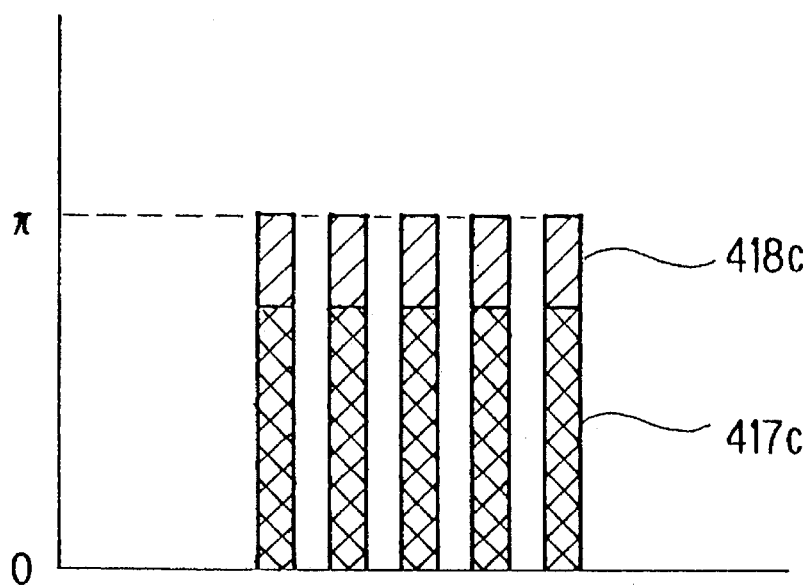
FIGS. 16A and 16B are graphs each showing the variation of phase by the polarization diffraction plate shown in FIGS. 14
Figure 16B:
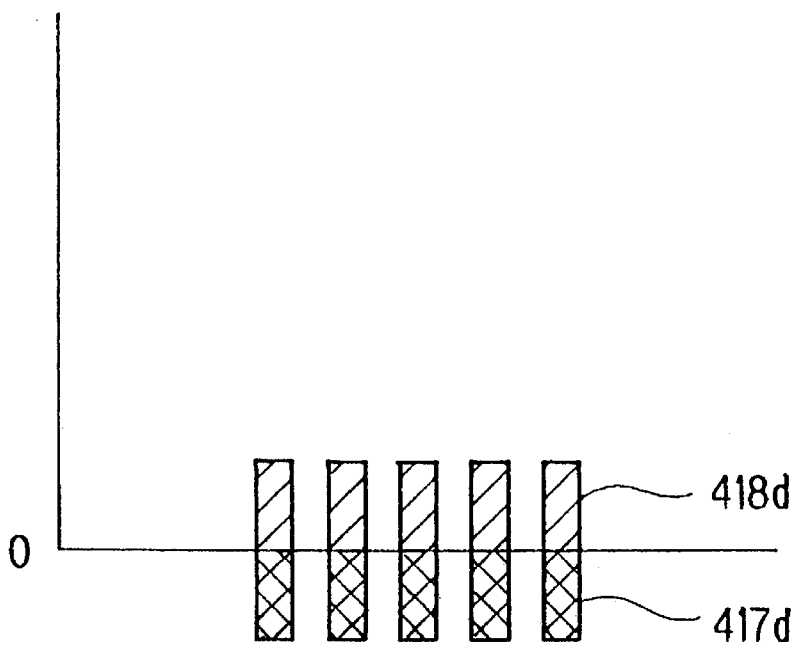

FIGS. 16A and 16B show the change of phase of light supplied to the polarization diffraction plate 405b, in which FIG. 16A is for an extraordinary light, polarized in a direction parallel to the optical axis, and FIG. 16B is for an ordinary light, polarized in a direction orthogonal to the optical axis. The difference of phase αe and αo between the line regions and space regions to extraordinary and ordinary lights at the diffraction grating region are given by the following formulas, respectively, where the differences of the indexes of refraction of the proton exchange region 415b and the LiNbO₃ substrate 414b to extraordinary and ordinary lights are Δne and Δno, the index of refraction of the dielectric film 416b is "n", the depth of the proton exchange region 415b is Tp, the thickness of the dielectric film 416b is Td, and the wavelength of light is λ:

$$2\pi/\lambda \times \{(n-1)Td + \Delta ne\ Tp\} = \alpha e$$

$$2\pi/\lambda \times \{(n-1)Td + \Delta no\ Tp\} = \alpha o$$

In FIGS. 16A and 16B, 418c and 418d show the change of phase by the dielectric film 416b, and 417c and 417d show the change of phase by the proton exchange region 415b, respectively.

In practice, Δne=0.12, Δno=−0.04, n=2.2 (when the dielectric film 416b is of $Nb_2O_5$). For example, when λ=0.78 μm, Tp=2.4375 μm and Td=81.25 nm, αe =π and αo=0. Accordingly, in the diffraction grating region, the differences of phase between the line regions and space regions are π and 0 in response to an extraordinary light and an ordinary light, respectively. If each line region and each space region has the same width, the transmission rates of extraordinary and ordinary lights are as follows, respectively:

$$\cos^1(\alpha e/2) = 0$$

$$\cos^2(\alpha o/2) = 1$$

As a result, an extraordinary light is diffracted by the diffraction grating region, while an ordinary light passes through the polarization diffraction plate 405b.

Figure 17:
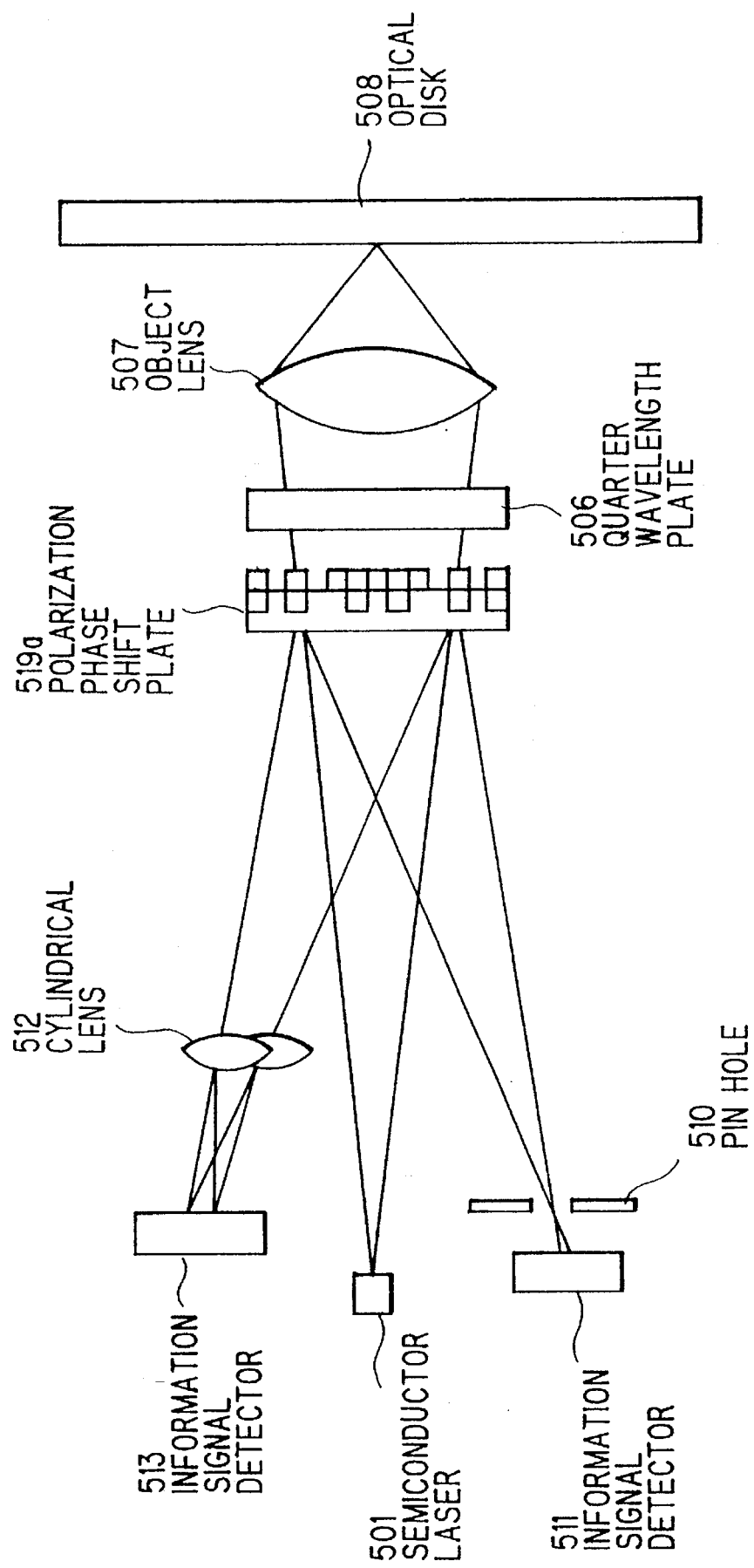
FIG. 17 is an schematic diagram illustrating an optical head system of a third preferred embodiment according to the invention.

FIG. 17 shows an optical head system of a third preferred embodiment, which includes a semiconductor laser 501 providing laser beams, a polarization phase shift plate 519a arranged to receive a laser beam supplied from the semiconductor laser 501, a quarter (¼) wavelength plate 506 arranged next to the polarization phase shift plate 519a, an object lens 507 arranged between the quarter wavelength plate 506 and an optical disk 508, a pin hole 510 arranged so that a reflection light from the optical disk 508 passes through the hole, an information signal detector 511 arranged to receive a light passing through the pin hole 510, a cylindrical lens 512 arranged to receive a reflection light from the optical disk 508, and an error signal detector 513 arranged to receive a light passing through the cylindrical lens 512. In this system, an actuator may be employed to drive the polarization phase shift plate 519a, the ¼ wavelength plate 506 and the object lens 507 all together.

Figure 18:
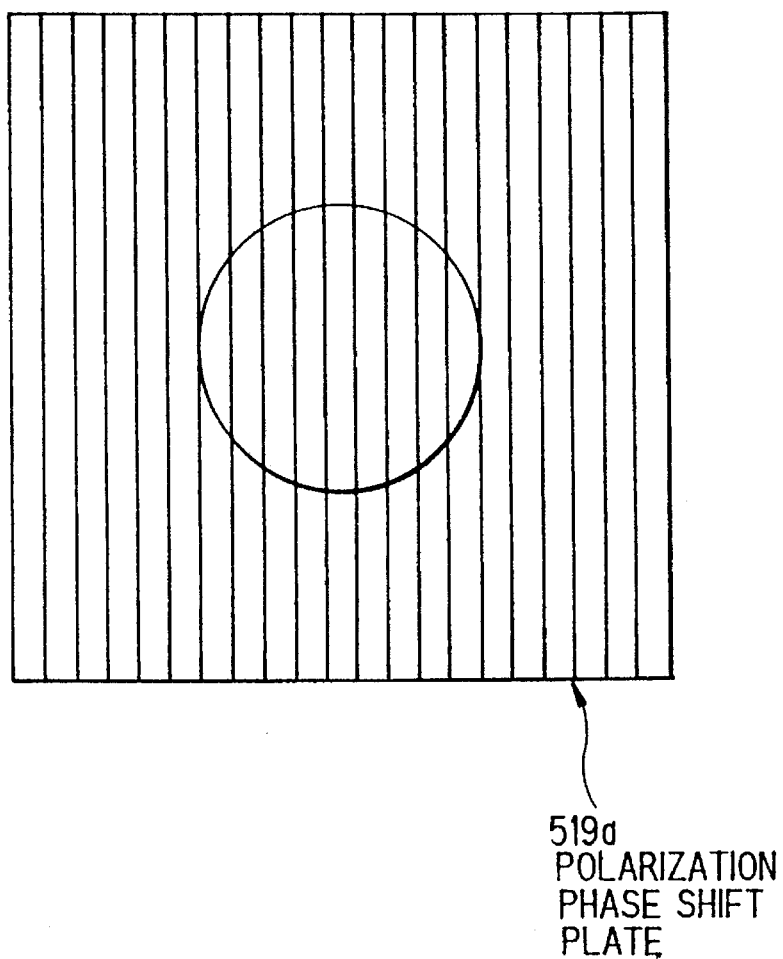
FIG. 18 is a plane view showing a polarization phase shift plate used in the third preferred embodiment.
Figure 19:
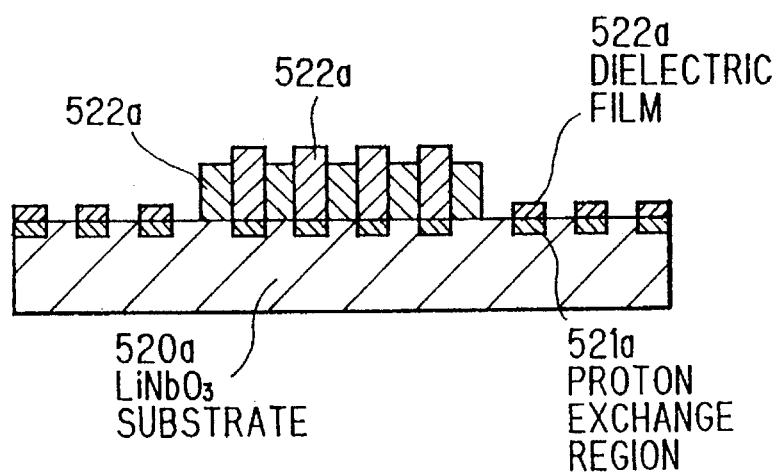
FIG. 19 is a cross sectional view showing the polarization phase shift plate shown in FIG. 18.

FIGS. 18 and 19 show the polarization phase shift plate 519a, which includes a LiNbO₃ substrate 520a, a proton exchange region 521a formed in the LiNbO₃ substrate 520a, and a dielectric film 522a provided on the proton exchange region 521a. The polarization phase shift plate 519a is provided at the center with a round shaped diffraction grating region and a peripheral diffraction grating region having a double layered structure of the proton exchange region 521a and the dielectric film 522a. The dielectric film 522a may be made of $Nb_2O_5$. An ordinary light supplied to the round shape region is shifted in phase by π, while an extraordinary light supplied thereto is completely diffracted.

In operation, a light generated by the semiconductor laser 501 is supplied as an ordinary light to the polarization phase shift plate 519a, so that the ordinary light in the round shaped region is shifted in phase by π. The light is supplied to the quarter wavelength plate 506, so that the light is converted into a circular polarized light. The circular polarized light is condensed on the optical disk 508 by the object lens 507. A light reflected from the optical disk 508 is backwardly supplied through the object lens 507 and the quarter wavelength plate 506 to the polarization phase shift plate 519a as an extraordinary light to be completely diffracted. A plus (+) primary diffracted light from the polarization phase shift plate 519a passes through the pin hole 510 and is received by the information signal detector 511 to reproduce information recorded on the optical disk 508. On the other hand, minus (−) primary diffracted light from the polarization phase shift plate 519a is applied with astigmatism by the cylindrical lens 512, and the light is received by the error signal detector 513. In accordance with the light received by the error signal detector 513, focus error and track error are detected. The function and operation of the error signal detector 513 are the same as those of the conventional one shown in FIG. 8.

Figure 20A:
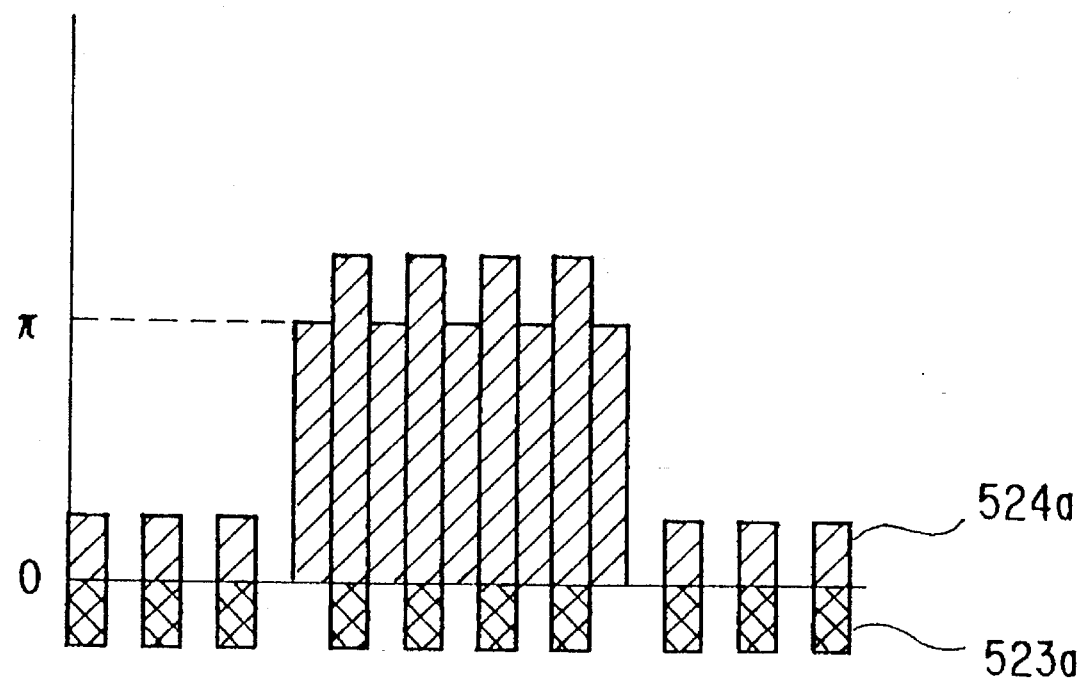
FIGS. 20A and 20B are graphs each showing the variation of phase by the polarization phase shift plate shown in FIGS. 18 and 19.
Figure 20B:
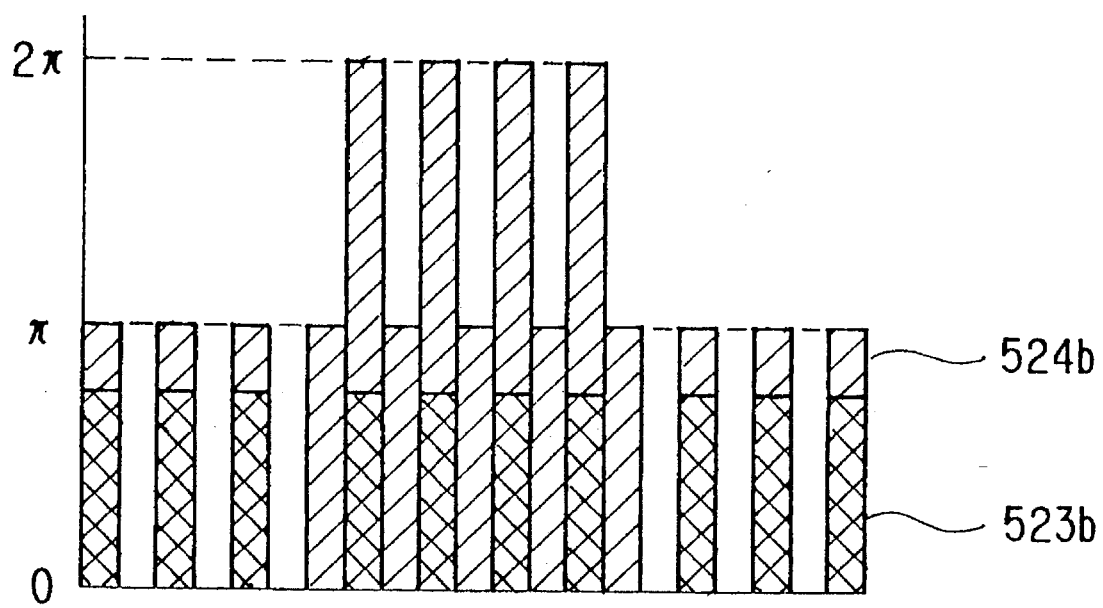

FIGS. 20A and 20B show the change of phase of light supplied to the polarization phase shift plate 519a, in which FIG. 20A is for an ordinary light, polarized in a direction orthogonal to the optical axis, and FIG. 20B is for an extraordinary light, polarized in a direction parallel to the optical axis. It is assumed that the differences of the indexes of refraction of the proton exchange region 521a and the LiNbO$_3$ substrate 520a to extraordinary and ordinary lights are Δne and Δno, the index of refraction of the dielectric film 522a is "n", and the wavelength of the light is λ. In FIGS. 20A and 20B, 524a and 524b show the change of phase by the dielectric film, and 523a and 523b show the change of phase by the proton exchange region, respectively. In practice, Δne=0.12, Δno=−0.04, n=2.2 (when the dielectric film 522a is of Nb$_2$O$_5$) and λ=0.78 μm.

In the diffraction grating formed in the round shape region of the polarization phase shift plate 519a, when it is assumed that the thickness of the dielectric film 522a at the single layer portion is Td1, the depths of the proton exchange region 521a and the thickness of the dielectric film 522a at the double layered portion are Tp2 and Td2, respectively, and the differences of phase between the line regions (single layered portion) and space regions (double layered portion) to ordinary and extraordinary lights are αo and αe, the following equations can be obtained:

$$2\pi/\lambda \times \{(n-1)(Td1-Td2)\} = \alpha o$$

$$2\pi/\lambda \times \{(n-1)(Td1-Td2) - \Delta ne\ Tp2\} = \alpha e$$

For example, when Td1=325 nm, Tp2=2.4375 μm and Td2=406.25 nm, the differences of phase become αo=0 and αe=−π.

Next, in the diffraction grating surrounding the round shape region of the polarization phase shift plate 519a, when it is assumed that the thickness of the dielectric film 522a is Td, the depth of the proton exchange region 521a is Tp, and the differences of phase between the line regions and space regions to ordinary and extraordinary lights are αo and αe, the following equations can be obtained:

$$2\pi/\lambda \times \{(n-1)Td + \Delta no\ Tp\} = \alpha o$$

$$2\pi/\lambda \times \{(n-1)Td + \Delta ne\ Tp\} = \alpha e$$

For example, when Tp=2.4375 μm and Td=81.25 nm, the differences of phase become αo=0 and αe=π.

In the round shaped phase shift region, the shifted lengths of phase δo and δe of ordinary and extraordinary lights are given by the following equations:

(1) At the line portions:

$$2\pi/\lambda \times \{(n-1)(Td1-Td) - \Delta no\ Tp\} = \delta o$$

$$2\pi/\lambda \times \{(n-1)(Td1-Td) - \Delta ne\ Tp\} = \delta e$$

(2) At the space portions:

$$2\pi/\lambda \times \{(n-1)Td2 + \Delta no\ TP2\} = \delta o$$

$$2\pi/\lambda \times \{(n-1)Td2 + \Delta ne\ Tp2\} = \delta e$$

As described above, δo=π and δe=0 at the line portions, and δo=π and δe=2π at the space portions.

Therefore, to an ordinary light, the difference of phase between the line and space portions in the round shaped diffraction grating is zero, the difference of phase between the line and space portions in the diffraction grating outside the round shaped diffraction grating is zero as well, and the shifted length of phase in the round shaped phase shift region is π. On the other hand, to an extraordinary light, the difference of phase between the line and space portions in the round shaped diffraction grating is π (=−π), the difference of phase between the line and space portions in the diffraction grating outside the round shaped diffraction grating is π, and the shifted length of phase in the round shaped phase shift region is zero (=2π).

If each line region and each space region has the same width, the transmission rates of ordinary and extraordinary lights each of inside and outside the round shape region are as follows, respectively:

$$\cos^2(\alpha o/2) = 1$$

$$\cos^2(\alpha e/2) = 0$$

± primary diffraction rates of ordinary and extraordinary lights each of inside and outside the round shape region are as follows, respectively:

$$(2/\pi)^2 \sin^2(\alpha o/2) = 0$$

$$(2/\pi)^2 \sin^2(\alpha e/2) = 0.405$$

Thus, an ordinary light supplied to the round shape region of the polarization phase shift plate 519a is shifted in phase by π, while an extraordinary light supplied thereto is completely diffracted. 40.5% of a reflection light reflected from the optical disk 508 is supplied toward the information signal detector 511 as a plus primary (+1) diffracted light of the polarization phase shift plate 519a, and another 40.5% of the reflection light is supplied toward the error signal detector 513 as a minus primary (−1) diffracted light of the polarization phase shift plate 519a.

Figure 21A:
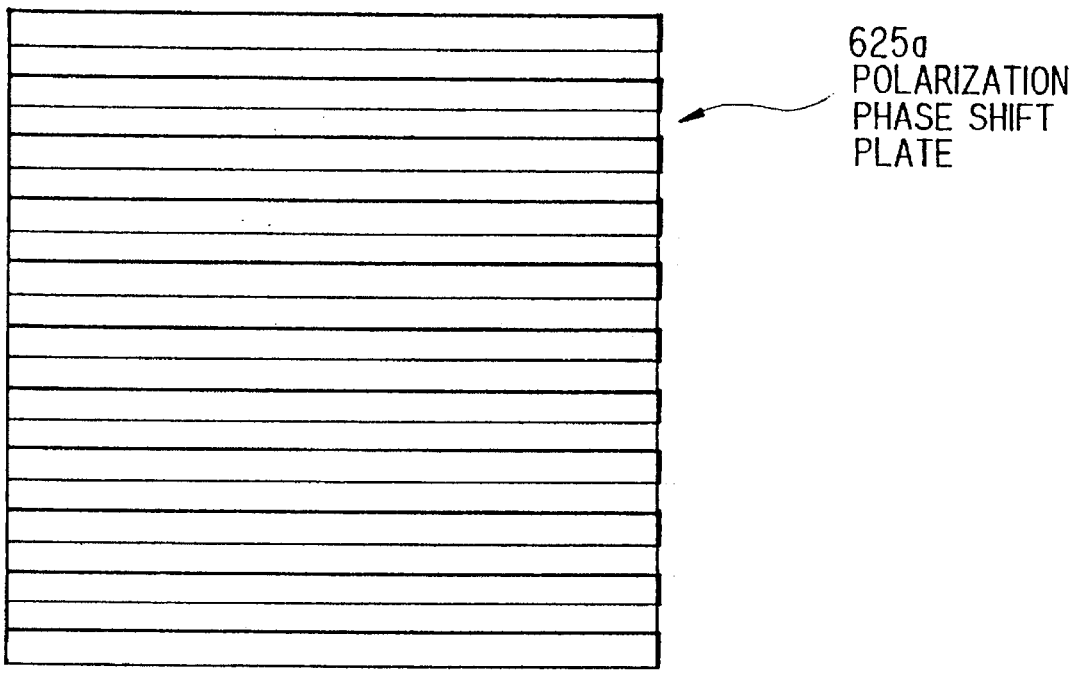
FIG. 21A is a plane view showing a surface of a polarization phase shift plate according to a fourth preferred embodiment.
Figure 21B:
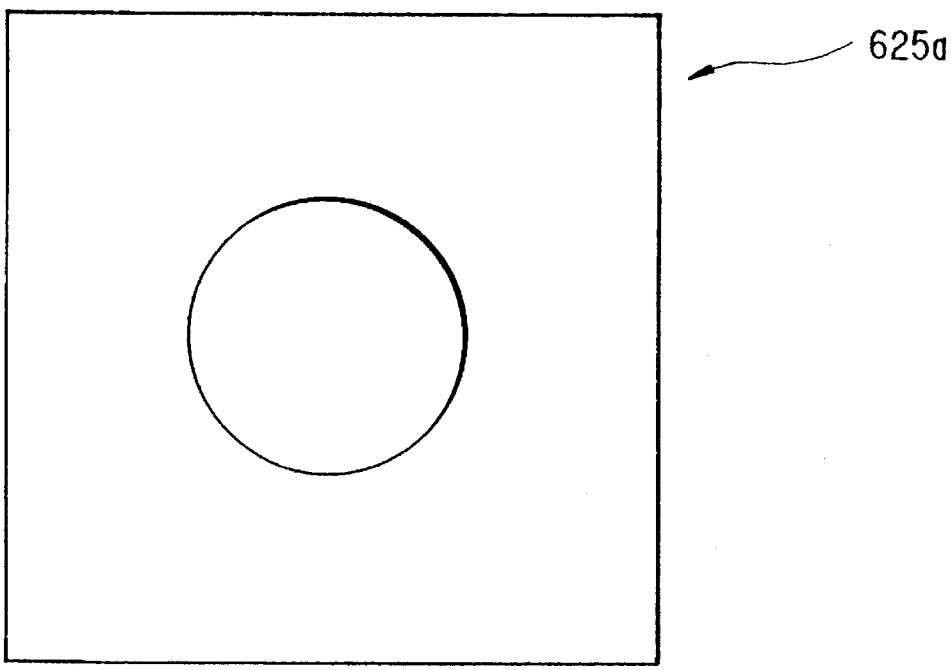
FIG. 21B is a plane view showing the other surface of the polarization phase shift plate according to the fourth preferred embodiment.
Figure 22:
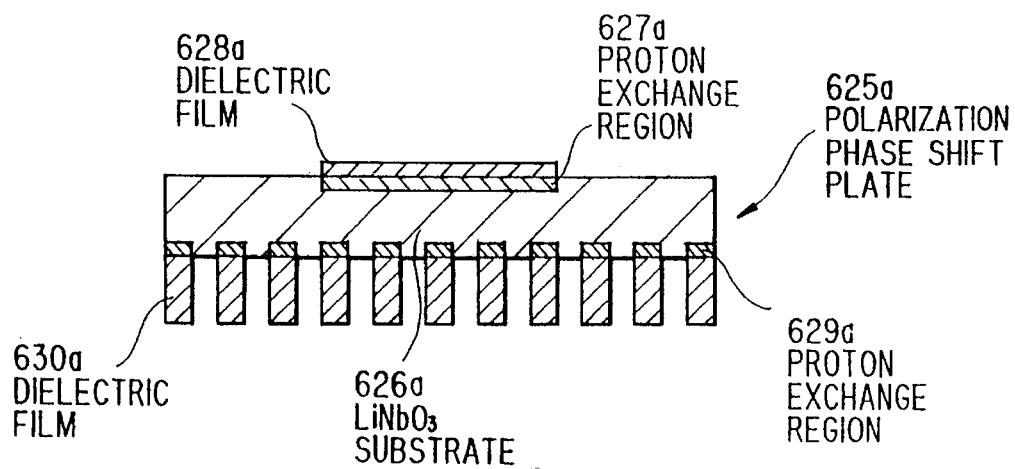
FIG. 22 is a cross sectional view showing the polarization phase shift plate shown in FIGS. 21A and 21B.

An optical head system of a fourth preferred embodiment, is designed by changing the polarization phase shift plate 519a, used in the third preferred embodiment shown in FIG. 17, into a polarization phase shift plate 625a shown in FIGS. 21A, 21B and 22. FIGS. 21A and 21B are plan views from a semiconductor laser and an optical disk, respectively. The polarization phase shift plate 625a includes a LiNbO$_3$ substrate 626a, a round shaped phase shift region formed on a first surface of the substrate 626a and a diffraction grating region formed on a first surface of the substrate 626a and a diffraction grating region formed on a second surface of the substrate 626a. The phase shift region is composed of a proton exchange region 627a and a dielectric film 628a, while the diffraction grating region is composed of a proton exchange region 629a and a dielectric film 630a. The dielectric films 628a and 630a may be made of Nb$_2$O$_5$.

Figure 23A:
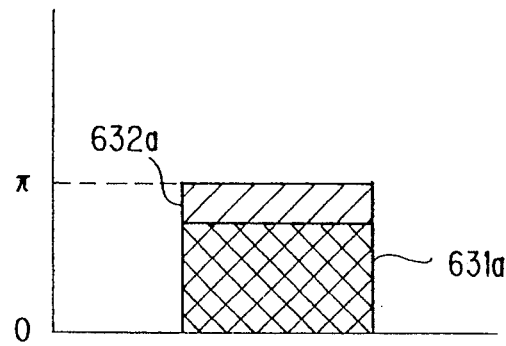
FIGS. 23A to 23D are graphs each showing the variation of phase by the polarization phase shift plate shown in FIGS. 21A, 21B and 22.
Figure 23C:
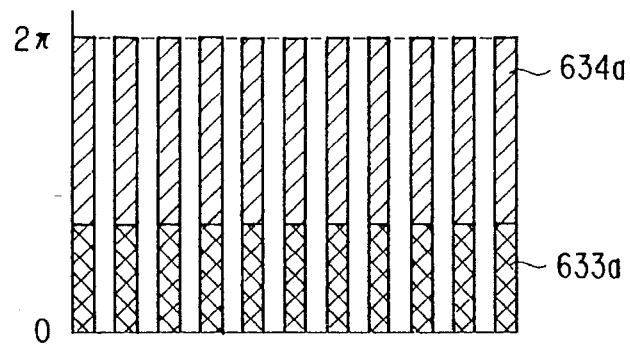
Figure 23B:
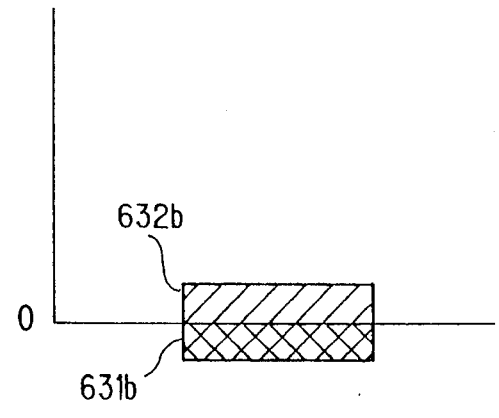
Figure 23D:
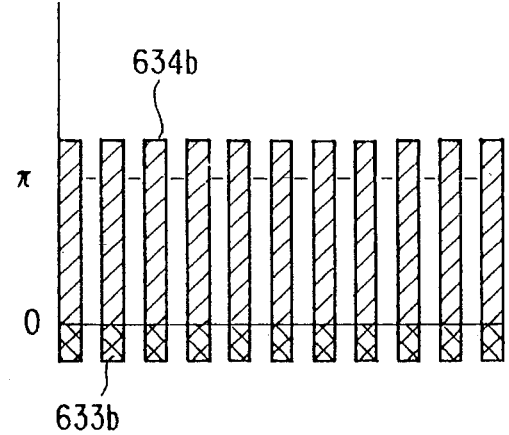

FIGS. 23A and 23B show change of phase by the first surface of the phase shift plate 625a to an extraordinary light polarized in a direction parallel to the optical axis and to an ordinary light polarized in a direction orthogonal to the optical axis, respectively. FIGS. 23C and 23D show change of phase by the second surface of the phase shift plate 625a to an extraordinary light polarized in a direction parallel to the optical axis and to an ordinary light polarized in a direction orthogonal to the optical axis, respectively. In FIGS. 23A, 23B, 23C and 23D, "632a" and "632b" represent change of phase by the dielectric film 628a, "631a" and "631b" represent change of phase by the proton exchange region 627a, "634a" and "634b" represent change of phase by the dielectric film 630a, "633a" and "633b" represent change of phase by the proton exchange region 629a.

It is assumed that the differences of the indexes of refraction between the proton exchange regions 627a and 629a and the LiNbO$_3$ substrate 626a to extraordinary and ordinary lights are $\Delta n e$ and $\Delta n o$, respectively, the index of refraction of the dielectric films 628a and 630a is "n", and the wavelength of the light is $\lambda$. In practice, $\Delta n e = 0.12$, $\Delta n o = -0.04$, n=2.2 (in case the dielectric films 628a and 630a are of Nb$_2$O$_5$) and $\lambda=0.78$ μm.

In the first surface of the polarization phase shift plate 625a, when the depth of the proton exchange region 627a and the thickness of the dielectric film 628a are Tp1 and Td1, respectively, and the differences of phase by the round shaped phase shift region to extraordinary and ordinary lights are δe and δo, respectively, the following equations can be obtained:

$$2\pi/\lambda \times \{(n-1)Td1 + \Delta ne\ Tp1\} = \delta e$$

$$2\pi/\lambda \times \{(n-1)Td1 + \Delta no\ Tp1\} = \delta o$$

For example, in case that Tp1=2.4375 μm and Td1=81.25 nm, the differences of phase become δe=π and δo=0.

In the second surface of the polarization phase shift plate 625a, when the depth of the proton exchange region 629a and the thickness of the dielectric film 630a are Tp2 and Td2, respectively, and the differences of phase between the line regions and space regions to extraordinary and ordinary lights are αe and αo, the following equations can be obtained:

$$2\pi/\lambda \times \{(n-1)Td2 + \Delta ne\ Tp2\} = \alpha e$$

$$2\pi/\lambda \times \{(n-1)Td2 + \Delta no\ Tp2\} = \alpha o$$

For example, when Tp2=2.4375 μm and Td2=406.25 nm, the differences of phase become αe=2π and αo=π.

Thus, an extraordinary light, supplied to the polarization phase shift plate 625a, is shifted in phase by π at the round shaped phase shift region on the first surface, and is transmitted according to a phase difference 0 (=2π) between the line portions and space portions at the diffraction grating region of the second surface. On the other hand, an ordinary light, supplied to the polarization phase shift plate 625a, is shifted in phase by 0 at the round shaped phase shift region on the first surface, and is diffracted according to a phase difference π between the line portions and space portions at the diffraction grating region of the second surface.

If each line region and each space region has the same width, the transmission rates of extraordinary and ordinary lights on the second surface are as follows, respectively:

$$\cos^2(\alpha e/2) = 1$$

$$\cos^2(\alpha o/2) = 0$$

± primary diffraction rates of extraordinary and ordinary lights are as follows, respectively:

$$(2/\pi)^2 \sin^2(\alpha e/2) = 0$$

$$(2/\pi)^2 \sin^2(\alpha o/2) = 0.405$$

Thus, an extraordinary light supplied to the round shaped phase shift region of the polarization phase shift plate 625a is shifted in phase by π, while an ordinary light supplied thereto is completely diffracted. 40.5% of a reflection light reflected from the optical disk is supplied toward the information signal detector as a plus primary (+1) diffracted light of the polarization phase shift plate 625a, and another 40.5% of the reflection light is supplied toward the error signal detector as a minus primary (−1) diffracted light of the polarization phase shift plate 625a.

In the above described fourth preferred embodiment, another type of polarization phase shift plate can be used, which includes a first LiNbO$_3$ substrate provided on a surface with a round shaped phase shift region and a second LiNbO$_3$ substrate provided with a surface with a diffraction grating region. The first and second substrates are stuck together so that the phase shift and diffraction grating regions face outside. In the diffraction grating region, the depth of a proton exchange region and the thickness of a dielectric region are designed so that phase differences between line portions and space portions to ordinary and extraordinary lights are 0 and π, respectively, and the optical axes of the first and second LiNbO$_3$ substrates are orthogonal to each other.

Figure 24:
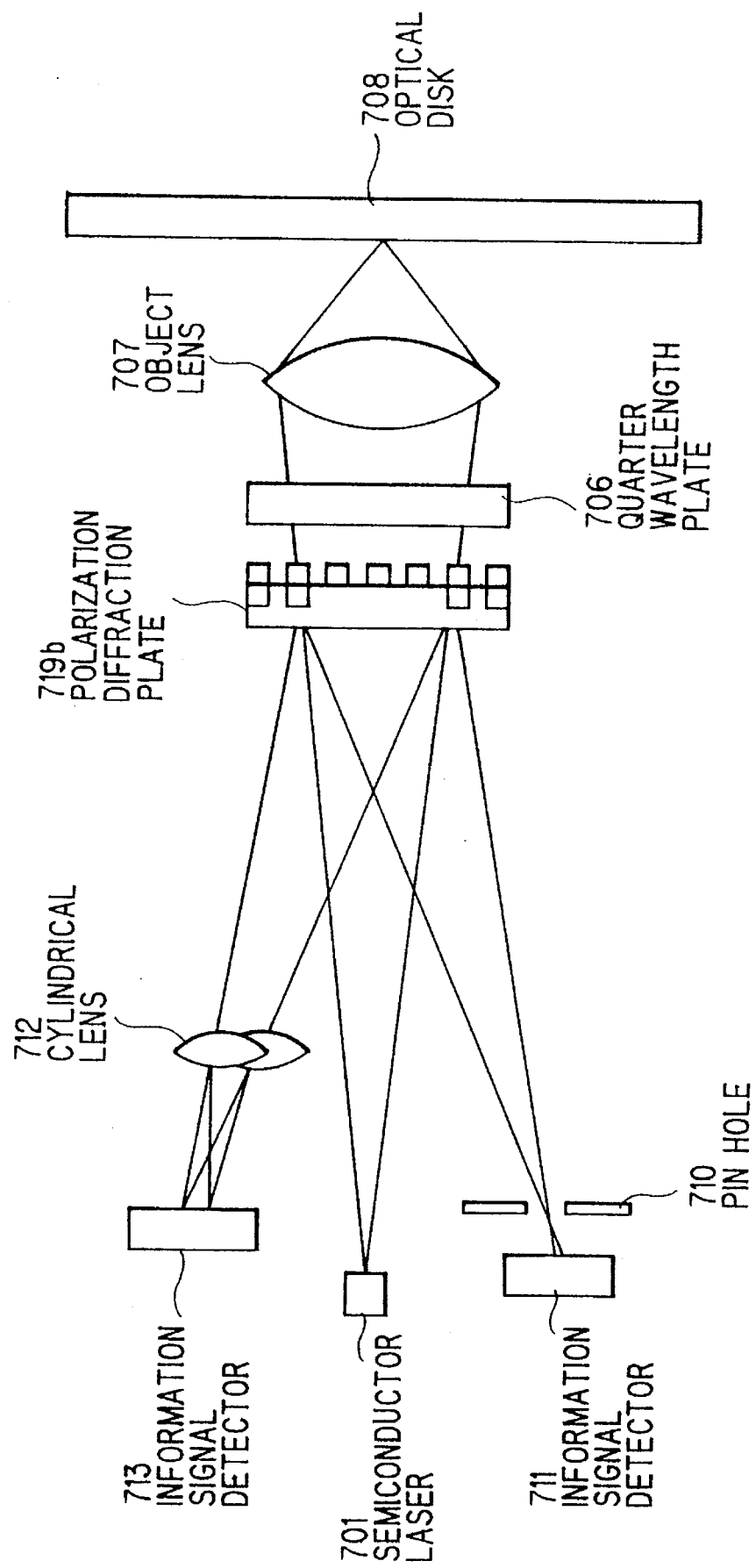
FIG. 24 is an schematic diagram illustrating an optical head system of a fifth preferred embodiment according to the invention.

FIG. 24 shows an optical head system of a fifth preferred embodiment, which includes a semiconductor laser 701 providing laser beams, a polarization diffraction plate 719b arranged to receive a laser beam supplied from the semiconductor laser 701, a quarter (¼) wavelength plate 706 arranged next to the polarization diffraction plate 719b, an object lens 707 arranged between the quarter wavelength plate 706 and an optical disk 708, a pin hole 710 arranged so that a reflection light from the optical disk 708 passes through the hole, an information signal detector 711 arranged to receive a light passing through the pin hole 710, a cylindrical lens 712 arranged to receive a reflection light from the optical disk 708, and an error signal detector 713 arranged to receive a light passing through the cylindrical lens 712. In this system, an actuator may be employed to drive the polarization diffraction plate 719b, the ¼ wavelength plate 706 and the object lens 707 all together.

Figure 25:
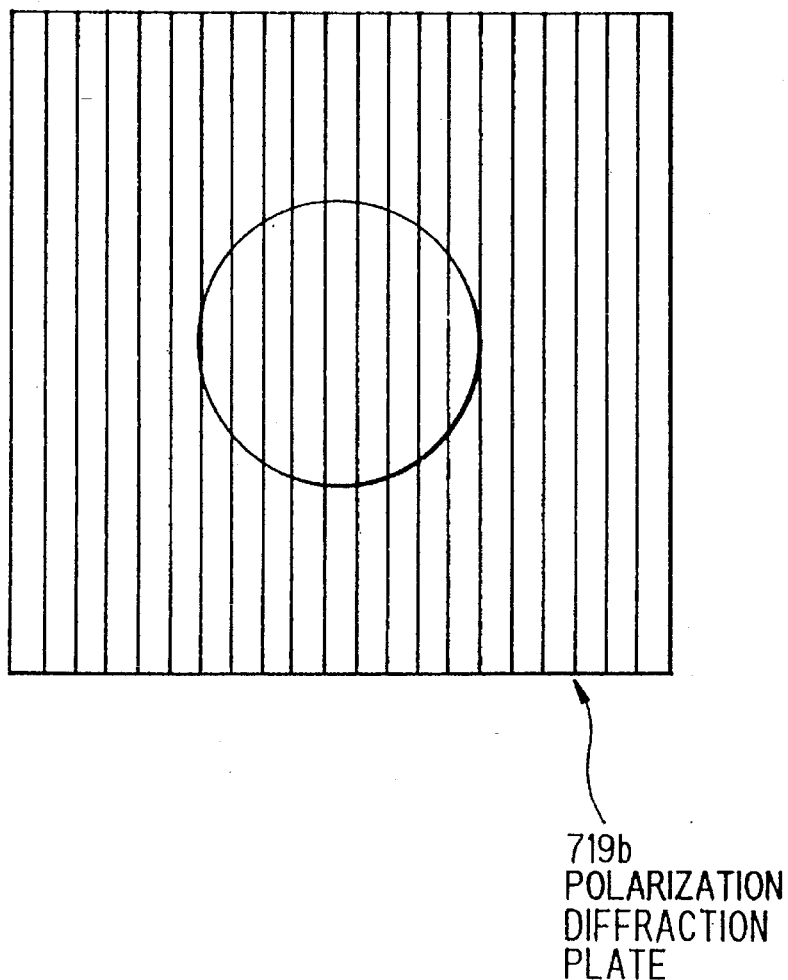
FIG. 25 is a plane view showing a polarization diffraction plate used in the fifth preferred embodiment.
Figure 26:
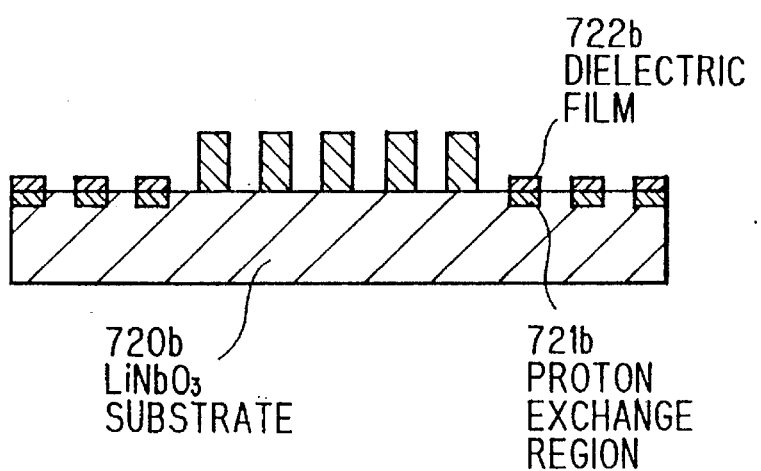
FIG. 26 is a cross sectional view showing the polarization diffraction plate shown in FIG. 25.

FIGS. 25 and 26 show the polarization diffraction plate 719b, which includes a LiNbO$_3$ substrate 720b, a proton exchange region 721b formed in the LiNbO$_3$ substrate 720b, and a dielectric film 722b provided on the substrate 720b. The polarization diffraction plate 719b is provided at the center with a round shaped diffraction grating region and a peripheral diffraction grating region having a double layered structure of the proton exchange region 721b and the dielectric film 722b. The dielectric film 722b may be made of Nb$_2$O$_5$.

In operation, a light generated by the semiconductor laser 701 is supplied as an ordinary light to the polarization diffraction plate 719b, so that the ordinary light in the round shaped region is completely diffracted. The transmitted light is supplied to the quarter wavelength plate 706, so that the light is converted into a circular polarized light. The circular polarized light is condensed on the optical disk 708 by the object lens 707. A light reflected from the optical disk 708 is backwardly supplied through the object lens 707 and the quarter wavelength plate 706 to the polarization diffraction plate 719b as an extraordinary light to be completely diffracted. A plus (+) primary diffracted light from the polarization diffraction plate 719b passes through the pin hole 710 and is received by the information signal detector 711 to reproduce information recorded on the optical disk 708. On the other hand, minus (−) primary diffracted light from the polarization diffraction plate 719*b* is applied with astigmatism by the cylindrical lens 712, and the light is received by the error signal detector 713. In accordance with the light received by the error signal detector 713, focus error and track error are detected. The function and operation of the error signal detector 713 are the same as those of the conventional one shown in FIG. 8.

Figure 27A:
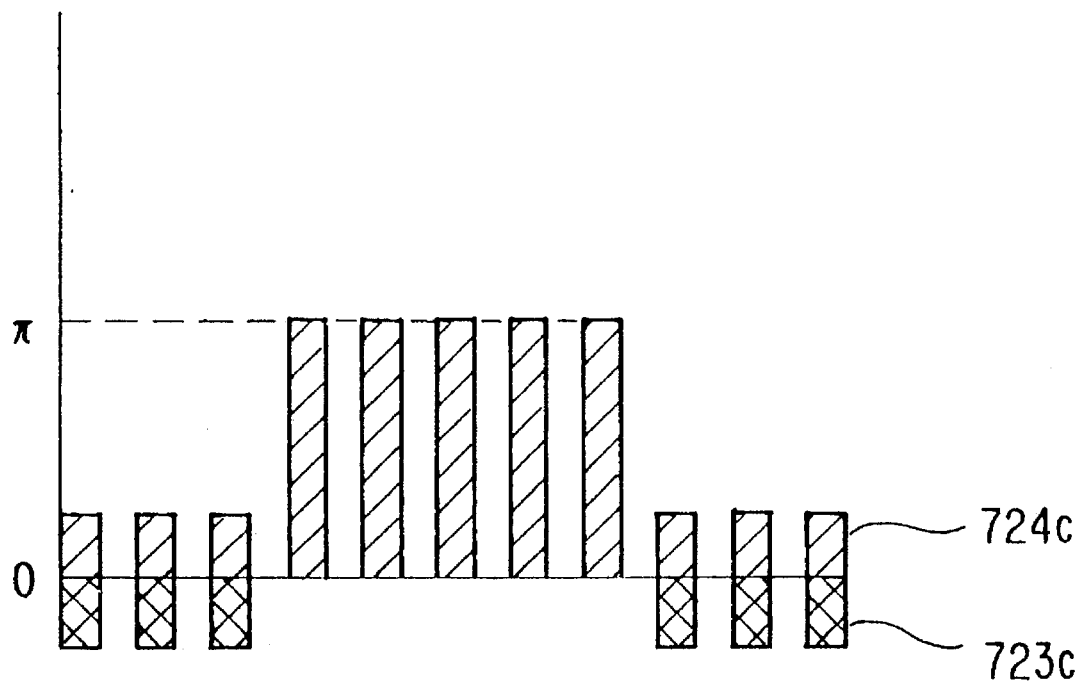
FIGS. 27A and 27B are graphs each showing the variation of phase by the polarization diffraction plate shown in FIGS. 25 and 26.
Figure 27B:
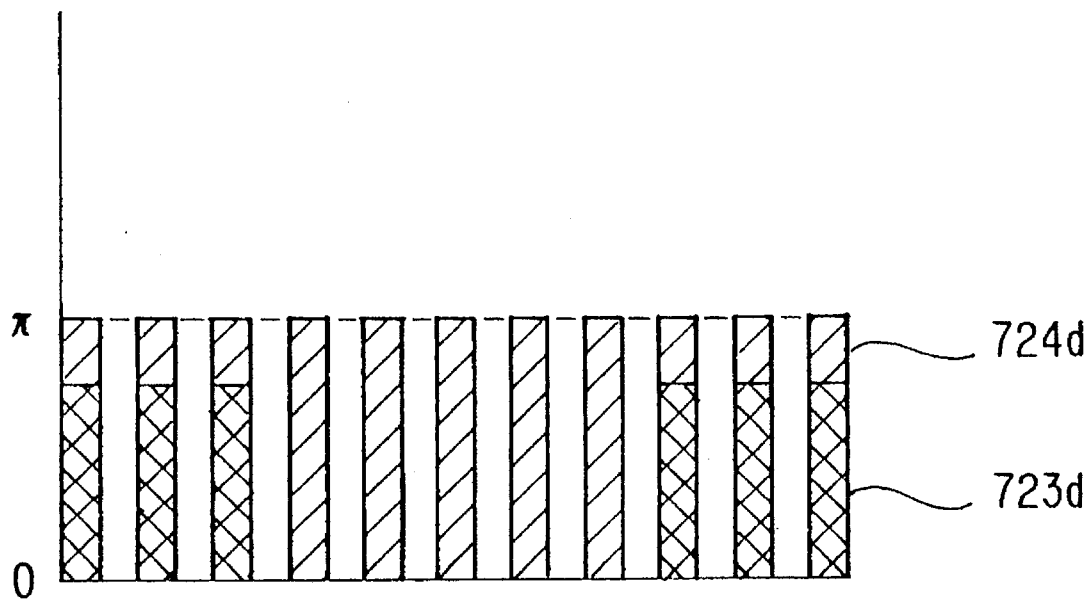

FIGS. 27A and 27B show the change of phase of light supplied to the polarization diffraction plate 719*b*, in which FIG. 27A is for an ordinary light, polarized in a direction orthogonal to the optical axis, and FIG. 27B is for an extraordinary light, polarized in a direction parallel to the optical axis. It is assumed that the differences of the indexes of refraction of the proton exchange region 721*b* and the LiNbO$_8$ substrate 720*b* to extraordinary and ordinary lights are $\Delta$ne and $\Delta$no, the index of refraction of the dielectric film 722*b* is "n", and the wavelength of the light is $\lambda$. In FIGS. 27A and 27B, 724*c* and 724*d* show the change of phase by the dielectric film, and 723*c* and 723*d* show the change of phase by the proton exchange region, respectively. In practice, $\Delta$ne=0.12, $\Delta$no=−0.04, n=2.2 (when the dielectric film 722*b* is of Nb$_2$O$_5$) and $\lambda$=0.78 μm. In the diffraction grating formed in the round shaped region of the polarization diffraction plate 719*b*, when the thickness of the dielectric film 722*b* is Td1 and the differences of phase between the line regions and space regions to ordinary and extraordinary lights are αo and αe, respectively, the following equations can be obtained:

$$2\pi/\lambda \times (n-1)Td1 = \alpha o$$

$$2\pi/\lambda \times (n-1)Td1 = \alpha e$$

For example, when Td1=325 nm, the differences of phase become αo=π and αe=π.

Next, in the diffraction grating surrounding the round shaped region of the polarization diffraction plate 719*b*, when the depth of the proton exchange region 721*b* and the thickness of the dielectric film 722*b* are Tp and Td, respectively, and the differences of phase between the line regions and space regions to ordinary and extraordinary lights are αo and αe, the following equations can be obtained:

$$2\pi/\lambda \times \{(n-1)Td + \Delta no\, Tp\} = \alpha o$$

$$2\pi/\lambda \times \{(n-1)Td + \Delta ne\, Tp\} = \alpha e$$

For example, when Tp=2.4375 μm and Td=81.25 nm, the differences of phase become αo=0 and αe=π.

Therefore, to an ordinary light, the difference of phase between the line and space portions in the round shaped diffraction grating is π, the difference of phase between the line and space portions in the diffraction grating outside the round shaped diffraction grating is zero. On the other hand, to an extraordinary light, the difference of phase between the line and space portions in the round shaped diffraction grating is π, the difference of phase between the line and space portions in the diffraction grating outside the round shaped diffraction grating is π.

If each line region and each space region has the same width, the transmission rates of ordinary and extraordinary lights inside the round shape region are as follows, respectively:

$$cos^2(\alpha o/2) = 0$$

$$cos^2(\alpha e/2) = 0$$

± primary diffraction rates of ordinary and extraordinary lights are as follows, respectively:

$$(2/\pi)^2 sin^2(\alpha o/2) = 0.405$$

$$(2/\pi)^2 sin^2(\alpha e/2) = 0.405$$

The transmission rates of ordinary and extraordinary lights outside the round shape region are as follows, respectively:

$$cos^2(\alpha o/2) = 1$$

$$cos^2(\alpha e/2) = 0$$

± primary diffraction rates of ordinary and extraordinary lights are as follows, respectively:

$$(2/\pi)^2 sin^2(\alpha o/2) = 0$$

$$(2/\pi)^2 sin^2(\alpha e/2) = 0.405$$

Thus, an ordinary light supplied to the round shape region of the polarization diffraction plate 719*b* is completely diffracted, while an extraordinary light supplied thereto is completely diffracted as well. 40.5% of a reflection light reflected from the optical disk 708 is supplied toward the information signal detector 711 as a plus primary (+1) diffracted light of the polarization phase shift plate 719*b*, and another 40.5% of the reflection light is supplied toward the error signal detector 713 as a minus primary (−1) diffracted light of the polarization diffraction plate 719*b*.

Figure 28A:
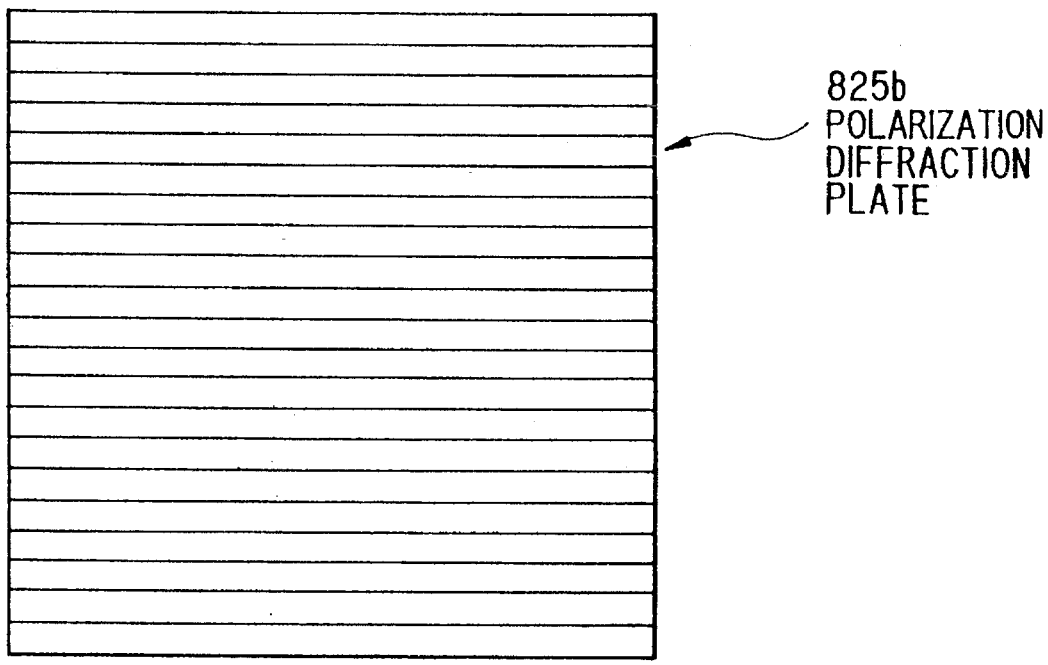
FIG. 28A is a plane view showing a surface of a polarization diffraction plate according to a sixth preferred embodiment.
Figure 28B:
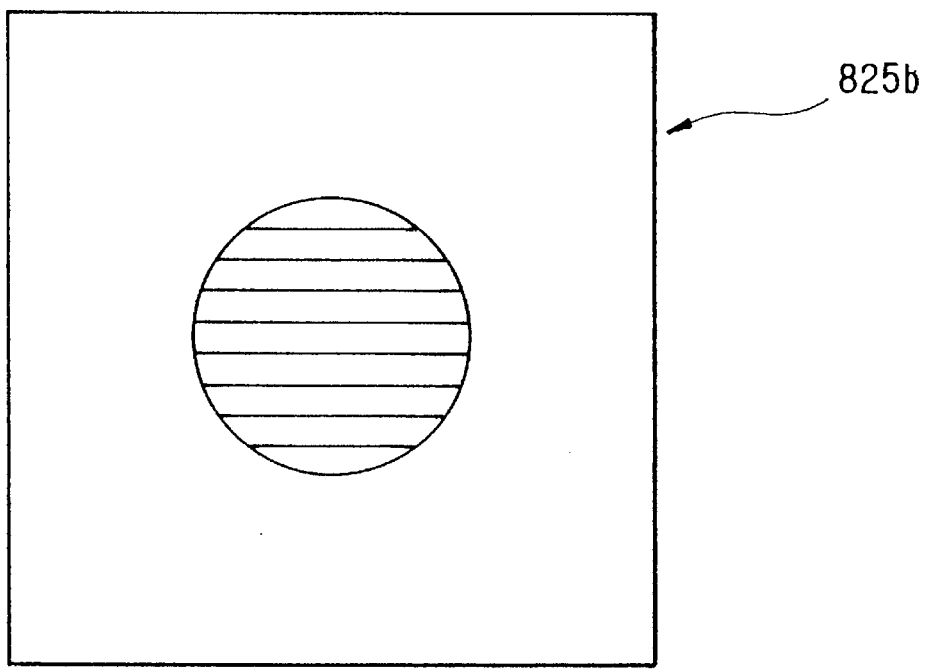
FIG. 28B is a plane view showing the other surface of the polarization diffraction plate according to the sixth preferred embodiment.
Figure 29:
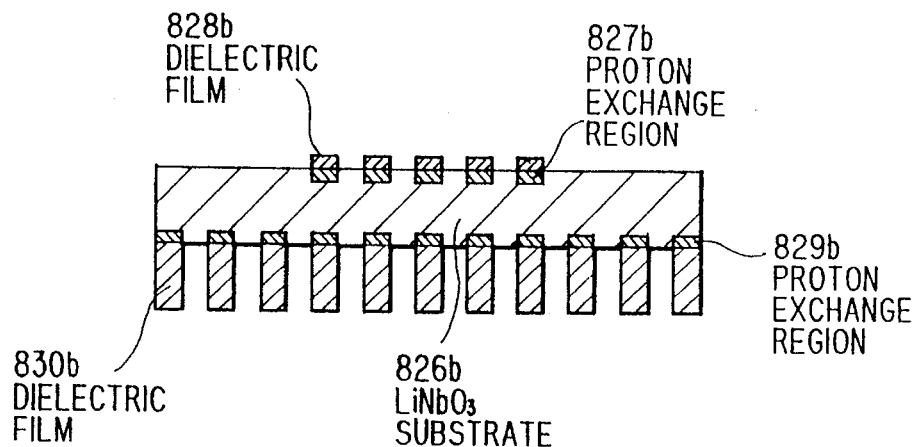
FIG. 29 is a cross sectional view showing the polarization diffraction plate shown in FIGS. 28A and 28B.

An optical head system of a sixth preferred embodiment, is designed by changing the polarization diffraction plate 719*b*, used in the fifth preferred embodiment shown in FIGS. 24, 25 and 26, into a polarization diffraction plate 825*b* shown in FIGS. 28A, 28B and 29. FIGS. 28A and 28B are plan views looking from a semiconductor laser and an optical disk, respectively. The polarization diffraction plate 825*b* includes a LiNbO$_3$ substrate 826*b*, a round shaped first diffraction grating region formed on a first surface of the substrate 826*b* and a second diffraction grating region formed on a second surface of the substrate 826*b*. The first diffraction grating region is composed of a proton exchange region 827*b* and a dielectric film 828*b*, while the second diffraction grating region is composed of a proton exchange region 829*b* and dielectric film 830*b*. The dielectric films 828*b* and 830*b* may be made of Nb$_2$O$_5$.

Figure 30A:
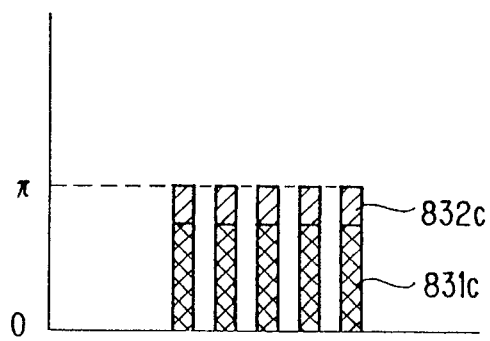
FIGS. 30A to 30D are graphs each showing the variation of phase by the polarization diffraction plate shown in FIGS. 28A, 28B and 30.
Figure 30B:
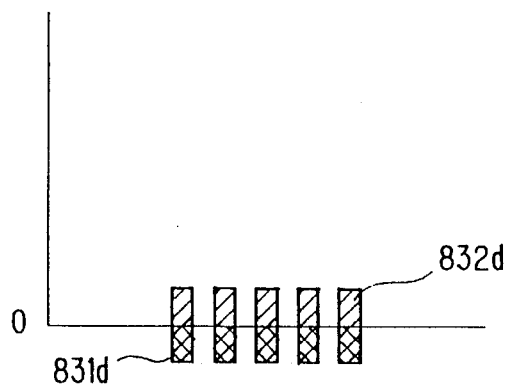
Figure 30C:
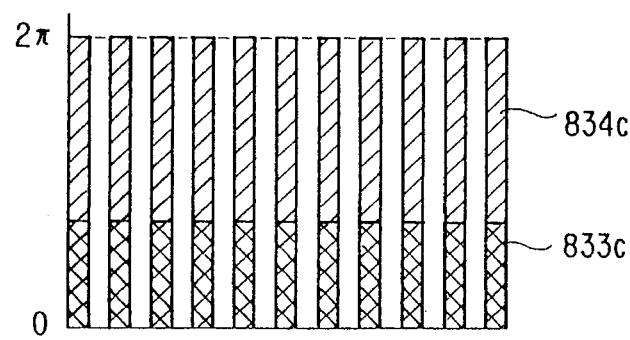
Figure 30D:
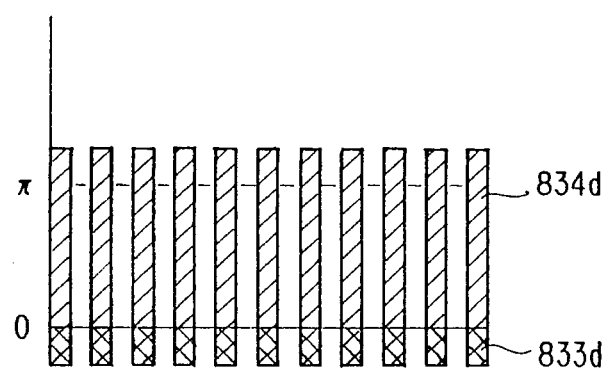

FIGS. 30A and 30B show change of phase by the first surface of the diffraction plate 825*b* to an extraordinary light polarized in a direction parallel to the optical axis and to an ordinary light polarized in a direction orthogonal to the optical axis, respectively. FIGS. 30C and 30D show change of phase by the second surface of the diffraction plate 825*b* to an extraordinary light polarized in a direction parallel to the optical axis and to an ordinary light polarized in a direction orthogonal to the optical axis, respectively. In FIGS. 30A, 30B, 30C and 30D, "832*c*" and "832*d*" represent change of phase by the dielectric film 828*b*, "831*c*" and "831*d*" represent change of phase by the proton exchange region 827*b*, "834*c*" and "834*d*" represent change of phase by the dielectric film 830*b*, "833*c*" and "833*d*" represent change of phase by the proton exchange region 829*b*.

It is assumed that the differences of the indexes of refraction between the proton exchange regions 827*b* and 829*b* and the LiNbO$_3$ substrate 826*b* to extraordinary and ordinary lights are $\Delta$ne and $\Delta$no, respectively, the index of refraction of the dielectric films 828*b* and 830*b* is "n", and the wavelength of the light is $\lambda$. In practice, $\Delta$ne=0.12, $\Delta$no=−0.04, n=2.2 (when the dielectric films 828*b* and 830*b* are of Nb$_2$O$_5$) and $\lambda$=0.78 μm.

In the first surface of the polarization diffraction plate 825*b*, when the depth of the proton exchange region 827*b* and the thickness of the dielectric film 828b are Tp1 and Td1, respectively, and the differences of phase between the line regions and the space regions in the round shaped diffraction grating region to extraordinary and ordinary lights are $\delta e$ and $\delta o$, respectively, the following equations can be obtained:

$$2\pi/\lambda \times \{(n-1)Td1 + \Delta ne\ Tp1\} = \delta e$$

$$2\pi/\lambda \times \{(n-1)Td1 + \Delta no\ Tp1\} = \delta o$$

For example, when Tp1=2.4375 μm and Td1=81.25 nm, the differences of phase become $\delta e = \pi$ and $\delta o = 0$.

In the second surface of the polarization diffraction plate 825b, when the depth of the proton exchange region 829b and the thickness of the dielectric film 830b are Tp2 and Td2, respectively, and the differences of phase between the line regions and space regions in the second diffraction grating region to extraordinary and ordinary lights are $\alpha e$ and $\alpha o$, the following equations can be obtained:

$$2\pi/\lambda \times \{(n-1)Td2 + \Delta ne\ Tp2\} = \alpha e$$

$$2\pi/\lambda \times \{(n-1)Td2 + \Delta no\ Tp2\} = \alpha o$$

For example, when Tp2=2.4375 μm and Td2=406.25 nm, the differences of phase become $\alpha e = 2\pi$ and $\alpha o = \pi$.

Thus, an extraordinary light, supplied to the first diffraction grating portion of the polarization diffraction plate 825b, is diffracted according to a phase difference $\pi$ between the line and space portions, and is transmitted according to a phase difference 0 (=$2\pi$) between the line and space portions at the second diffraction grating region of the second surface. On the other hand, an ordinary light, supplied to the first diffraction grating region of the polarization diffraction plate 825b, is transmitted according to a phase difference 0 between the line and space portions, and is diffracted according to a phase difference $\pi$ between the line and space portions at the second diffraction grating region of the second surface.

If each line region and each space region has the same width, the transmission rates of extraordinary and ordinary lights on the first surface are as follows, respectively:

$$\cos^2(\delta e/2) = 0$$

$$\cos^2(\delta o/2) = 1$$

± primary diffraction rates of extraordinary and ordinary lights are as follows, respectively:

$$(2/\pi)^2 \sin^2(\delta e/2) = 0.405$$

$$(2/\pi)^2 \sin^2(\delta o/2) = 0$$

The transmission rates of extraordinary and ordinary lights on the second surface are as follows, respectively:

$$\cos^2(\alpha e/2) = 1$$

$$\cos^2(\alpha o/2) = 0$$

± primary diffraction rates of extraordinary and ordinary lights are as follows, respectively:

$$(2/\pi)^2 \sin^2(\alpha e/2) = 0$$

$$(2/\pi)^2 \sin^2(\alpha o/2) = 0.405$$

Thus, an extraordinary light supplied to the first diffraction grating region of the polarization diffraction plate 825b is completely diffracted, while an ordinary light supplied thereto is completely diffracted as well. 40.5% of a reflection light reflected from the optical disk is supplied toward the information signal detector as a plus primary (+1) diffracted light of the polarization diffraction plate 825b, and another 40.5% of the reflection light is supplied toward the error signal detector as a minus primary (−1) diffracted light of the polarization diffraction plate 825b.

In the above described sixth preferred embodiment, another type of polarization diffraction plate can be used, which includes a first $LiNbO_3$ substrate provided on a surface with a round shaped first diffraction grating region and a second $LiNbO_3$ substrate provided with a surface with a second diffraction grating region. The first and second substrates are stuck together so that the diffraction grating regions face outside. In the second diffraction grating region, the depth of a proton exchange region and the thickness of a dielectric region are designed so that phase differences between line and space portions to ordinary and extraordinary lights are 0 and $\pi$, respectively, and the optical axes of the first and second $LiNbO_3$ substrates are orthogonal to each other.

According to the first to sixth preferred embodiments, only the ¼ wavelength plate is arranged between the polarization phase shift plate (or diffraction plate) and the object lens, so that the distance between the polarization phase shift plate (or diffraction plate) and the object lens can be the same as the focal length of the object lens easily and flexibly.

According to the third to sixth preferred embodiments, each polarization phase shift plates and diffraction plates can be used for performing the function of a pair of polarizing beam splitters used in conventional technology, so that the optical head system can be more miniaturized. The semiconductor laser, information signal detector and error signal detector can be arranged in a small space, so that the system can be more miniaturized, and mis-positioning based on change of temperature, or the like, can be reduced.

In the first to sixth preferred embodiments, each of the polarization phase shift plates and polarization diffraction plates is provided with a round shaped phase shift region or diffraction region, however, those regions can be shaped square, such as a slit. If the square shaped region is arranged in a direction orthogonal to the track of the optical disk, a condensed light spot has a smaller width in a direction parallel to the track of the optical disk, and the line density of the optical disk can be increased. On the other hand, if the square shaped region is arranged in a direction parallel to the track of the optical disk, a condensed light spot has a smaller width in a direction orthogonal to the track of the optical disk, and the track density of the optical disk can be increased. In those cases, the pin hole can be replaced by a slit arranged in a direction parallel to the square region, so that side lobes of a condensed light spot can be reduced.

In the first to sixth preferred embodiment, when a polarization phase shift plate or diffraction plate, a ¼ wavelength plate and object lens are driven all together by an actuator, tracking control can be realized without shifting the optical axis; and therefore, a light condensed on the optical disk has symmetric distribution in strength. Further, according to the invention, phase distribution of a light to be condensed on an optical disk can be equalized.

Although the invention has been described with respect to the specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. An optical head system for detecting information recorded on an optical recording medium, comprising:

a light source which supplies an input light toward a surface of the optical recording medium;

an object lens, positioned between the light source and the optical recording medium, which condenses the input light to the optical recording medium;

a first polarization beam splitter, positioned between the light source and the object lens, which separates a reflection light reflected from the optical disk to form an information signal, from the input light passing through the first polarization beam splitter;

an information signal detector which receives the information signal and detects information recorded on the optical recording medium in accordance with the received information signal; and a super resolution element arranged between the polarization beam splitter and the object lens for decreasing the diameter of a condensed light spot on the optical recording medium, the super resolution element being designed so that a light reflected from the optical recording medium passes through the element substantially unchanged;

wherein said super resolution element includes a polarization phase shift plate including a phase shift region for shifting by $\pi$ the phase of a light polarized in a first linear direction and for permitting a light polarized in a second linear direction which is orthogonal to the first linear direction to pass through the phase shift region.

2. The optical head system according to claim 1, further comprising:

a second polarization beam splitter positioned between the light source and the first polarization beam splitter for separating the reflection light to form an error signal, from the input light passing through the second polarization beam splitter; and an error signal detector which receives the error signal and detects an error from the error signal.

3. The optical head system according to claim 1, wherein:

said light source includes a semiconductor laser for supplying a laser beam.

4. The optical head system according to claim 1, wherein:

said polarization phase shift plate comprises a LiNbO$_3$ substrate, a proton exchange region and a dielectric film, the phase shift region being composed of the proton exchange region and dielectric film.

5. The optical head system according to claim 1, further comprising:

a ¼ wavelength plate positioned between the super resolution element and the object lens; and an actuator for driving the super resolution element, the ¼ wavelength plate and the object lens all together.

6. The optical head system according to claim 1, wherein:

said optical head system is designed so that the focal length of the object lens is equal to the distance between the super resolution element and the object lens.

7. An optical head system for detecting information recorded on an optical recording medium, comprising:

a light source which supplies an input light toward a surface of the optical recording medium;

an object lens, positioned between the light source and the optical recording medium, which condenses the input light to the optical recording medium; and a super resolution element arranged between the light source and the object lens for decreasing the diameter of a condensed light spot on the optical recording medium, and also for diffracting a light reflected from the optical recording medium to an information signal detector;

wherein said information signal detector receives the light diffracted by the super resolution element and detects information recorded on the optical recording medium in accordance with the received light.

8. The optical head system according to claim 7, further comprising:

an error signal detector which receives the light diffracted by the super resolution element and detects an error signal from the received light.

9. The optical head system according to claim 7, wherein:

said light source is a semiconductor laser for supplying a laser beam.

10. The optical head system according to claim 7, wherein:

said super resolution element is a polarization phase shift plate provided with a phase shift region for shifting in phase by $\pi$ an input light polarized in a first linear direction, and for passing through the phase shift region an input light polarized in a second linear direction which is orthogonal to the first linear direction.

11. The optical head system according to claim 10, wherein:

said polarization phase shift plate comprises a LiNbO$_3$ substrate, a proton exchange region and a dielectric film, the phase shift region being composed of the proton exchange region and dielectric film.

12. The optical head system according to claim 7, wherein:

said super resolution element comprises a polarization diffraction plate including a diffraction grating region for diffracting an input light polarized in a first linear direction, and for passing through the diffraction grating region an input light polarized in a second linear direction which is orthogonal to the first linear direction.

13. The optical head system according to claim 12, wherein:

said polarization diffraction plate comprises a LiNbO$_3$ substrate, a proton exchange region and a dielectric film, the diffraction grating region being composed of the proton exchange region and dielectric film.

14. The optical head system according to claim 7, further comprising:

a ¼ wavelength plate positioned between the super resolution element and the object lens; and an actuator for driving the super resolution element, the ¼ wavelength plate and the object lens all together.

15. The optical head system according to claim 7, wherein:

said optical head system is designed so that the focal length of the object lens is equal to the distance between the super resolution element and the object lens.

16. An optical head system for detecting information recorded on an optical recording medium, comprising:

a light source which supplies an input light toward a surface of the optical recording medium;

an object lens, positioned between the light source and the optical recording medium, which condenses the input light to the optical recording medium;

a polarization beam splitter, positioned between the light source and the object lens, which separates a reflection light reflected from the optical disk to form an information signal, from the input light passing through the first polarization beam splitter;

an information signal detector which receives the information signal and detects information recorded on the optical recording medium in accordance with the received information signal; and a super resolution element arranged between the polarization beam splitter and the object lens for decreasing the diameter of a condensed light spot on the optical recording medium, the super resolution element being designed so that a light reflected from the optical recording medium passes through the element substantially unchanged;

wherein said super resolution element comprises a polarization diffraction plate including a diffraction grating region for diffracting a light polarized in a first linear direction and for permitting a light polarized in a second linear direction which is orthogonal to the first linear direction to pass through the diffraction grating region.

17. The optical head system according to claim 16, wherein:

said light source comprises a semiconductor laser for supplying a laser beam.

18. The optical head system according to claim 16, further comprising:

a ¼ wavelength plate positioned between the super resolution element and the object lens;

an actuator for driving the super resolution element, the ¼ wavelength plate, and the object lens all together.

19. The optical head system according to claim 16, wherein:

said optical head system is designed so that the focal length of the object lens is equal to the distance between the super resolution element and the object lens.

20. The optical head system according to claim 16, wherein:

said polarization diffraction plate comprises a $LiNbO_3$ substrate, a proton exchange region and a dielectric film, the diffraction grating region being composed of the proton exchange region and the dielectric film.

* * * * *

UNITED STATES PATENT AND TRADEMARK OFFICE
CERTIFICATE OF CORRECTION

PATENT NO. : 5,600,614
DATED : February 4, 1997
INVENTOR(S) : Ryuichi Katayama

It is certified that error appears in the above-indentified patent and that said Letters Patent is hereby corrected as shown below:

Title page, in the Appl. No., Item [21], "442,800" should be --442,300--.

Signed and Sealed this

Sixth Day of May, 1997

Attest:

BRUCE LEHMAN

*Attesting Officer*   *Commissioner of Patents and Trademarks*